United States Patent
Alvarez Gila et al.

(10) Patent No.: US 12,073,327 B2
(45) Date of Patent: Aug. 27, 2024

(54) QUANTIFYING OBJECTS ON PLANTS BY ESTIMATING THE NUMBER OF OBJECTS ON PLANT PARTS SUCH AS LEAVES, BY CONVOLUTIONAL NEURAL NETWORKS THAT PROVIDE DENSITY MAPS

(71) Applicant: BASF SE, Ludwigshafen am Rhein (DE)

(72) Inventors: Aitor Alvarez Gila, Derio (ES); Amaia Maria Ortiz Barredo, Vitoria-Gasteiz (ES); David Roldan Lopez, Dos Hermanas (ES); Javier Romero Rodriguez, Utrera (ES); Corinna Maria Spangler, Ludwigshafen (DE); Christian Klukas, Limburgerhof (DE); Till Eggers, Ludwigshafen (DE); Jone Echazarra Huguet, Derio (ES); Ramon Navarra Mestre, Limburgerhof (DE); Artzai Picon Ruiz, Derio (ES); Aranzazu Bereciartua Perez, Derio (ES)

(73) Assignee: BASF SE, Ludwigshafen am Rhein (DE)

( * ) Notice: Subject to any disclaimer, the term of this patent is extended or adjusted under 35 U.S.C. 154(b) by 312 days.

(21) Appl. No.: 17/761,849

(22) PCT Filed: Sep. 29, 2020

(86) PCT No.: PCT/EP2020/077197
§ 371 (c)(1),
(2) Date: Mar. 18, 2022

(87) PCT Pub. No.: WO2021/063929
PCT Pub. Date: Apr. 8, 2021

(65) Prior Publication Data
US 2023/0351743 A1  Nov. 2, 2023

(30) Foreign Application Priority Data
Sep. 30, 2019 (EP) .................................. 19200657

(51) Int. Cl.
*G06T 7/00* (2017.01)
*G06N 3/082* (2023.01)
(Continued)

(52) U.S. Cl.
CPC ............ *G06N 3/082* (2013.01); *G06T 7/0012* (2013.01); *G06T 7/11* (2017.01); *G06V 10/454* (2022.01);
(Continued)

(58) Field of Classification Search
CPC ........ G06N 3/082; G06N 3/045; G06N 3/048; G06N 20/10; G06T 7/0012; G06T 7/11;
(Continued)

(56) References Cited

U.S. PATENT DOCUMENTS 11,636,701 B2 * 4/2023 Lagerman .............. G06Q 50/02
382/110
2018/0121764 A1   5/2018 Zha et al.
(Continued)

FOREIGN PATENT DOCUMENTS

CN      104992439 A   10/2015
CN      108921849 A   11/2018
(Continued)

OTHER PUBLICATIONS

International Search Report and Written Opinion of International Application No. PCT/EP2020/077197 mailed Dec. 22, 2020, 10 pgs.
(Continued)

*Primary Examiner* — Bobbak Safaipour
(74) *Attorney, Agent, or Firm* — Lowenstein Sandler LLP

(57) ABSTRACT

Quantifying plant infestation is performed by estimating the number of biological objects (132) on parts (122) of a plant (112). A computer (202) receives a plant-image (412) taken from a particular plant (112). The computer (202) uses a first convolutional neural network (262/272) to derive a part-image (422) that shows a part of the plant. The computer (202) splits the part-image into tiles and uses a second network to process the tiles to density maps. The computer (202) combines the density maps to a combined density map
(Continued)

in the dimension of the part-image and integrates the pixel values to an estimate number of objects for the part. Object classes (132(1), 132(2)) can be differentiated to fine-tune the quantification to identify class-specific countermeasures.

15 Claims, 15 Drawing Sheets

(51) Int. Cl.
| | |
|---|---|
| *G06T 7/11* | (2017.01) |
| *G06V 10/44* | (2022.01) |
| *G06V 10/56* | (2022.01) |
| *G06V 10/762* | (2022.01) |
| *G06V 10/764* | (2022.01) |
| *G06V 10/82* | (2022.01) |
| *G06V 20/10* | (2022.01) |

(52) U.S. Cl.
CPC ............ *G06V 10/56* (2022.01); *G06V 10/762* (2022.01); *G06V 10/764* (2022.01); *G06V 10/82* (2022.01); *G06V 20/10* (2022.01); *G06V 20/188* (2022.01); *G06T 2207/20081* (2013.01); *G06T 2207/20084* (2013.01)

(58) Field of Classification Search
CPC .......... G06T 2207/20081; G06T 2207/20084; G06V 10/454; G06V 10/56; G06V 10/762; G06V 10/764; G06V 10/82; G06V 20/10; G06V 20/188; G06F 18/2414
See application file for complete search history.

(56) References Cited

U.S. PATENT DOCUMENTS

| | | | |
|---|---|---|---|
| 2019/0034736 A1 | 1/2019 | Bisberg et al. | |
| 2022/0183208 A1* | 6/2022 | Sibley | .................... G05D 1/249 |
| 2023/0071265 A1* | 3/2023 | Bereciartua-Perez | ...................... G06V 10/56 |

FOREIGN PATENT DOCUMENTS

| | | |
|---|---|---|
| CN | 108960310 A | 12/2018 |
| CN | 109843051 A | 6/2019 |
| KR | 20100106883 A | 10/2010 |

OTHER PUBLICATIONS

Wu, et al., "IP102: A Large-Scale Benchmark Dataset for Insect Pest Recognition", 2019 IEEE/CVF Conference On Computer Vision and Pattern Recognition 9CVPRO, IEEE, Jun. 15, 2019, pp. 8779-8788.

Alfarisy, et al., "Deep learning based classification for paddy pests & diseases recognition", Mathematics and Artificial Intelligence, Jan. 1, 2018, pp. 21-25.

Liu, et al., "Localization and Classification of Paddy Field Pests using a Saliency Map and Deep Convolutional Neural Netowrk", Sscientific Reports, Feb. 11, 2016, vol. 6, No. 1, pp. 1-12.

Mele, Katarina, "Insect Soup Challenge: Segmentation, Counting, and Simple Classificaiton", 2013 IEEE International Conference On Computer Vision Workshops, IEEE, Dec. 2, 2013, pp. 168-171.

Martineau, et al., "Effective Training of Convolutional Neural Networks for Insect Image Recognition", International Conference On Financial Cryptography and Data Security; [Lecture Notes in Computer Science; Letc. Notes Computer], Sep. 25, 2018, pp. 426-437.

* cited by examiner

QUANTIFYING OBJECTS ON PLANTS BY ESTIMATING THE NUMBER OF OBJECTS ON PLANT PARTS SUCH AS LEAVES, BY CONVOLUTIONAL NEURAL NETWORKS THAT PROVIDE DENSITY MAPS

CROSS-REFERENCE TO RELATED APPLICATIONS

This application is a national stage entry of International Application No. PCT/EP2020/077197, filed on Sep. 29, 2020, which claims the benefit of priority of European Application No. 19200657.5, filed on Sep. 30, 2019, the disclosures of which are hereby incorporated by reference herein in their entireties.

TECHNICAL FIELD

The disclosure generally relates to image processing by computers, and more in particular relates to techniques for quantifying objects on parts of the plant (or "plant parts" in short). Even more in particular, the disclosure relates to techniques for quantifying plant infestation by estimating the number of insects or other biological objects on plant leaves.

BACKGROUND

It is well known that agricultural plants—such as crops—grow in environments in that they co-exist with biological objects. These objects tend to be located at the plant, usually by being attached to the plants (at least temporarily); and the objects interact with the plant.

Different objects tend to attach themselves to different parts of the plants. For example, some insects may sit on the leaves, some others may stick to the stem or to a branch, and so one.

From the perspective of the farmer, the object-and-plant interaction has two directions or aspects. In a first direction, there are biological objects with a detrimental effect on the plants. For example, animal pests destroy crops, causing large economic loss to the food supply and to property. To give an illustrative example, a pest animal may eat from the leaves or may eat from the fruits of the crop.

In the other direction, there are also animals to the benefit of the plant. For example, the plant may have a direct benefit when a butterfly visit its flower or blossom, or the plant may have an indirect benefit if a ladybug eats aphids (or other pest).

The farmer may control the presence of these objects: to favor the absence of some objects (such as pest animals) and the presence of beneficiary objects.

The control measures are usually adapted to the quantity of the objects on the plants. In principle it does not matter where the object is located on the plant (leaf, stem, fruit or wherever) and what direction the interaction has.

To illustrate some of these aspects by way of example, insects of many species live on plant leaves. For example, whiteflies live on the leaves of eggplants.

In the broadest sense, the insects interact with the plant (for example by consuming part of the leaves). The insects can cause diseases or other abnormal conditions of the plant. Eventually, the plant does not survive the presence of the insects. But in agriculture, the plants should become food (i.e. crop for humans or animals), and insects being present on leaves are not desired at all. Food security is of vital importance.

Usual terms for such phenomena are "infestation" and "pest". Farmers apply countermeasures (e.g., treatment by applying insecticides) in order to remove the insects.

However, applying countermeasures may cause further problems or challenges. Countermeasures must be specific to particular insects, for example to remove the whiteflies but to keep the bees and others. Countermeasures should also take the quantity of the insects into account.

Quantifying the infestations, such as by counting insects (on plant leaves) is therefore an important task for pest management.

In theory, farmers could visually inspect the plant and could count the insects (taking the insect development stages into account). As different people have different knowledge (regarding insects) and have different eyes, different people would arrive at different numbers.

Using computer vision techniques appears as an improvement. A well-known (classical or traditional) approach is the extraction of image features with subsequent classification. However, there are many constraints arising. The constraints have many aspects, such as limitations of the computers and cameras, non-ideal conditions in the field and constraints related to the insects themselves.

US 2018/0121764 A1 explains an approach to selectively sterilizing insects. Insects are being reared, placed on a surface, photographed and selectively manipulated by robots. A computer processes the image and identifies location data for particular inspects, and thereby differentiates male insects from female insects. With the location data, the robot can then perform actions with respect to insects, such as removing particular insects.

Xiaoping Wu, Chi Zhan, Yukun Lai, Ming-Ming Cheng and Jufeng Yang: IP102: A Large-Scale Benchmark Dataset for Insect Pest Recognition, IEEE CVPR, pages 8787-8796, 15 Jun. 2019. In this article, Wu et al explain a large-scale database for insect pest recognition.

SUMMARY

The constraints are addressed by a computer system, a computer-implemented method and a computer program product for quantifying biological objects on plant parts (in the example: quantifying plant infestation, estimating the number of insects on leaves of a plant).

The computer program product—when loaded into a memory of a computer and being executed by at least one processor of the computer—performs the steps of the computer-implemented method.

In a production phase, the computer applies convolutional neural networks that had been trained previously in a training phase. The production phase is summarized first:

The computer receives a plant-image taken from a particular plant. The plant-image shows at least one of the leaves of the particular plant, the so-called main leaf (or main part).

The computer uses a first convolutional neural network to process the plant-image to derive a leaf-image being a contiguous set of pixels that show a main part of the particular plant completely (i.e. as a whole). The first convolutional neural network has been trained by a plurality of leaf-annotated plant-images, wherein the plant-images had been annotated to identify main parts.

The computer splits the leaf-image into a plurality of tiles. The tiles are segments or portions of the plant-image having pre-defined tile dimensions.

The computer uses a second convolutional neural network to separately process the plurality of tiles to obtain a plurality of density maps having map dimensions that correspond to the tile dimensions. The network having been trained by processing object-annotated plant-images, and the training comprised the calculation of convolutions for each pixel based on a kernel function, leading to density maps. The density maps have different integral values for tiles showing biological objects and tiles not showing biological objects.

The computer combines the plurality of density maps to a combined density map in the dimension of the leaf-image, and integrates the pixel values of the combined density map to an estimated number of biological objects for the part of the plant.

The first convolutional neural network—that is the network to identify the main leaf—can be of the DenseNet type. The second convolutional neural network—that is the network to estimate the number of biological objects on the part—can be of the convolutional neural network (FCRN) type.

The second convolutional neural network (FCRN type) can be a modified network that uses global sum pooling instead of global average pooling.

The convolutional neural network can be also be modified by using dropout.

The second convolutional neural network can also be modified by implementing an input layer as a pixel value filter for individual pixels or for pixel pluralities, the so-called tile segments.

For the pixel pluralities, the network uses a layer to convolute the pixel pluralities, to encode the convoluted segments into segment values so that a further layer applies filtering to the segment values. The second convolutional neural network can also been implemented with a layer to subsequently decode the segment values to the convoluted segments. This approach lets the network layers between the encoder and the decoder operate with numerical values for the segments and not with numerical values for the pixels. Since the number of segments is less than the number of pixels, the approach uses less computation resources (compared to pixel processing).

The second convolutional neural network can be trained by processing object-annotated plant-images for different classes. Classes are identified by object species (e.g., insect species) and by growing stages of the objects. Processing is separated for the classes by branches and output channels.

This approach can be advantageous—in the scenario that the biological objects are pest because it quantifies the plant infestation (by pest) with a granularity that allows fine-tuning countermeasures to particular pest classes.

In the production phase, receiving the plant-image can be performed by receiving the plant-image from the camera of a mobile device. This can be advantageous because mobile devices are readily available to farmers and because the mobile device allows the immediate communication of the plant-image to the computer that quantifies the plant infestation.

Receiving the plant-image can comprise evaluating the class (e.g., the pest class) and the pixel resolution of the camera of the mobile device according to pre-defined rules, wherein for some classes and resolutions, the mobile device is caused to take the image with a magnifying lens. This measure can improve the accuracy of the estimation. The farmer can be instructed via the user interface of the mobile device to apply the lens.

The second convolutional neural network can have been trained by using a loss-function being the mean absolute error or being the mean square error.

DETAILED DESCRIPTION

Writing Convention

Figure 1:
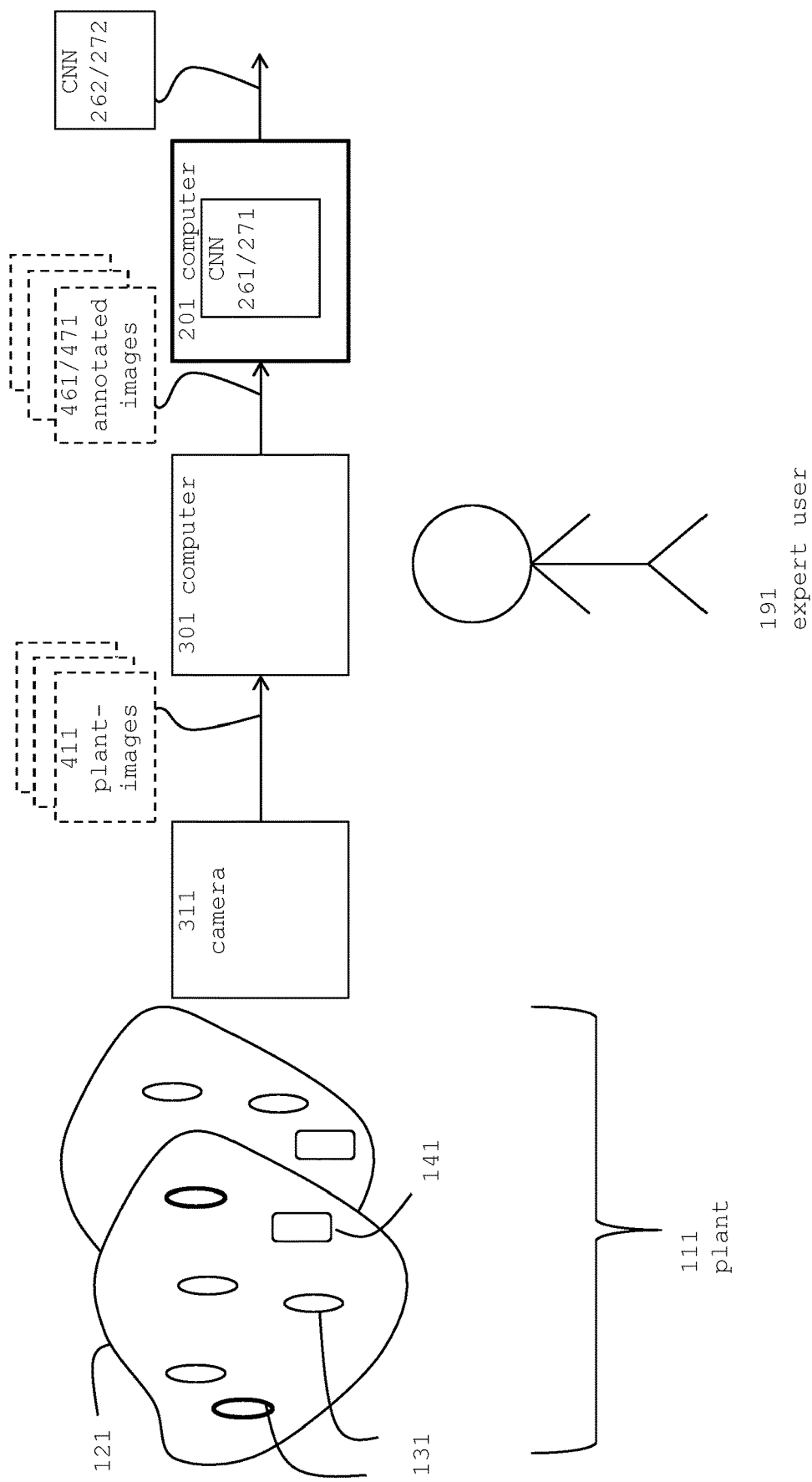
FIG. 1 illustrates an overview to a computer-implemented approach to teach—in a training phase—convolutional neural networks (CNN) to count insects on leaves.

The description starts by explaining some writing conventions.

The term "image" stands for the data-structure of a digital photograph (i.e., a data-structure using a file format such as JPEG, TIFF, BMP, RAW or the like). The phrase "take an image" stands for the action of directing a camera to an object (such as a plant, or a part of a plant) and letting the camera store the image.

The description uses the term "show" when it explains the content of images (i.e., the semantics), for example in phrases such as "the image shows a plant". There is however no need that a human user looks at the image. Such computer-user interactions are expressed with the term "display", such as in "the computer displays the plant-image to an expert", where an expert user looks at the screen to see the plant on the image.

The term "annotation" stands for meta-data that a computer receives when an expert user looks at the display of an image and interacts with the computer. The term "annotated image" indicates the availability of such meta-data for an image (or for a sub-region of that image), but there is no need to store the meta-data and the image in the same data-structure. Occasionally, the drawings illustrate annotations as part of an image, such as by polygon and/or dots, but again: the annotations are meta-data and there is no need to embed them into the data-structure of the image.

The images will only show plants with their above-ground (air) components, but not the root. Therefore, the term "plant part" (or "part" in short) refers to any of the following: stem, branch, leaf, flower (or blossom), fruit, bud, seed, fruit, node, and internode. The same principle applies to the plural form "parts": stems, branches, leaves, flowers and so on. Of course, not every plant will have parts in each category, so a young plant may not yet have fruits. As used herein, the description writes "leaf" as pars per to for "part".

This convention also applies to phrase such as "leaf-annotated" standing for "part-annotated".

In general, the term "insect" stands for animalia in the phylum "Arthropoda" or 1ARTHP (EPPO-code by the European and Mediterranean Plant Protection Organization). In implementations, the insects are of the subphylum "Hexapoda" (1HEXAQ). The description uses the term "insect" for simplicity and for convenience. It is noted that "insect" is a noun (in usual language) that most readers can easily apply for counting. The skilled person reading "one insect" or "two insects" immediately understands.

The term "insect" is also used to represent biological objects that are located on parts of the plant be counted.

A biological object (to be counted) has a physical size that is relatively smaller than the part on that it is located. It is also noted that the objects are located on one part. Since the plant images are processed to images showing one part (by segmentation), the size relation also transfers to the image.

To illustrates that: an insect sitting with some legs on a first leaf, and sitting with the other legs on a second leaf is not counted because the image would be segmented to one of the leaves. Or, a relatively large insect that shows up on the image covering a leaf and covering a branch could not be counted.

In terms of biological taxonomy, the biological objects can be insects or can be arachnids (i.e., being arthropoda), or the biological objects can be mollusca (not arthropod).

The internal structure of the biological objects does not matter, as long as it fits the size criterion. On other words, it does not matter is the object has an exoskeleton, a segmented body, and paired jointed appendages (as arthropods have) or not.

Further, for the computer, the different number of legs (e.g., insects 6 legs, arachnids 8 legs, or even no legs as with snails) does not matter for the computer.

The objects can also be spots on the surface of the plant parts (spots that are the result of biological processes, such as fungi interacting with the plant or the like, animal excrements, etc.). The person of skill in the art can identify suitable measures (e.g., countermeasures).

The use of the term "insects" is applicable to phrases such as "insect-annotated" or the like to the meaning "object-annotated".

Further, the interaction of the biological object with the plant (or with the stem branch etc. part) does not matter. The biological object can be pest or beneficial. The term "stage" (also "development stage", "growing stage") identifies differences in the life-cycle (or metamorphosis) of insects (i.e., of the biological objects in general), wherein an insect in a first stage has a different visual appearance than an insect in a second, subsequent stage. Biologists can differentiate the stages (or "stadia") by terms such as egg, larva, pupa, and imago. Other conventions can also be used, such as "adults" and "nymphs", or even standardized numerical identifiers such as "n1n2", "n3n4" and so on. Development stages of the plants are not differentiated.

The term "count" is short for "estimating a number", such as for estimating the number of insects on a leaf (i.e., number of biological objects on plant parts).

The description uses the term "train" as a label for a first process—the "training process"—that enables CNNs to count insects, and for the particular task to train a particular CNN by using annotated images.

For convenience, the description refers to hardware components (such as computers, cameras, mobile devices, communication networks) in singular terms. However, implementations can use multiple components. For example, "the camera taking a plurality of images" comprises scenarios in that multiple cameras participate so that some images are taken from a first camera, some image are taken from a second camera and so on.

In the figures, the suffixes "-1, -2 . . . " and so on distinguish like items; and suffixes "(1), (2) . . . " distinguish different items.

The term "class" is used in the general meaning to differentiate sets or the like, in case that the term "class" refers to a taxonomic rank in biology, this will be explained if needed.

Structure of the Document

Figure 2:
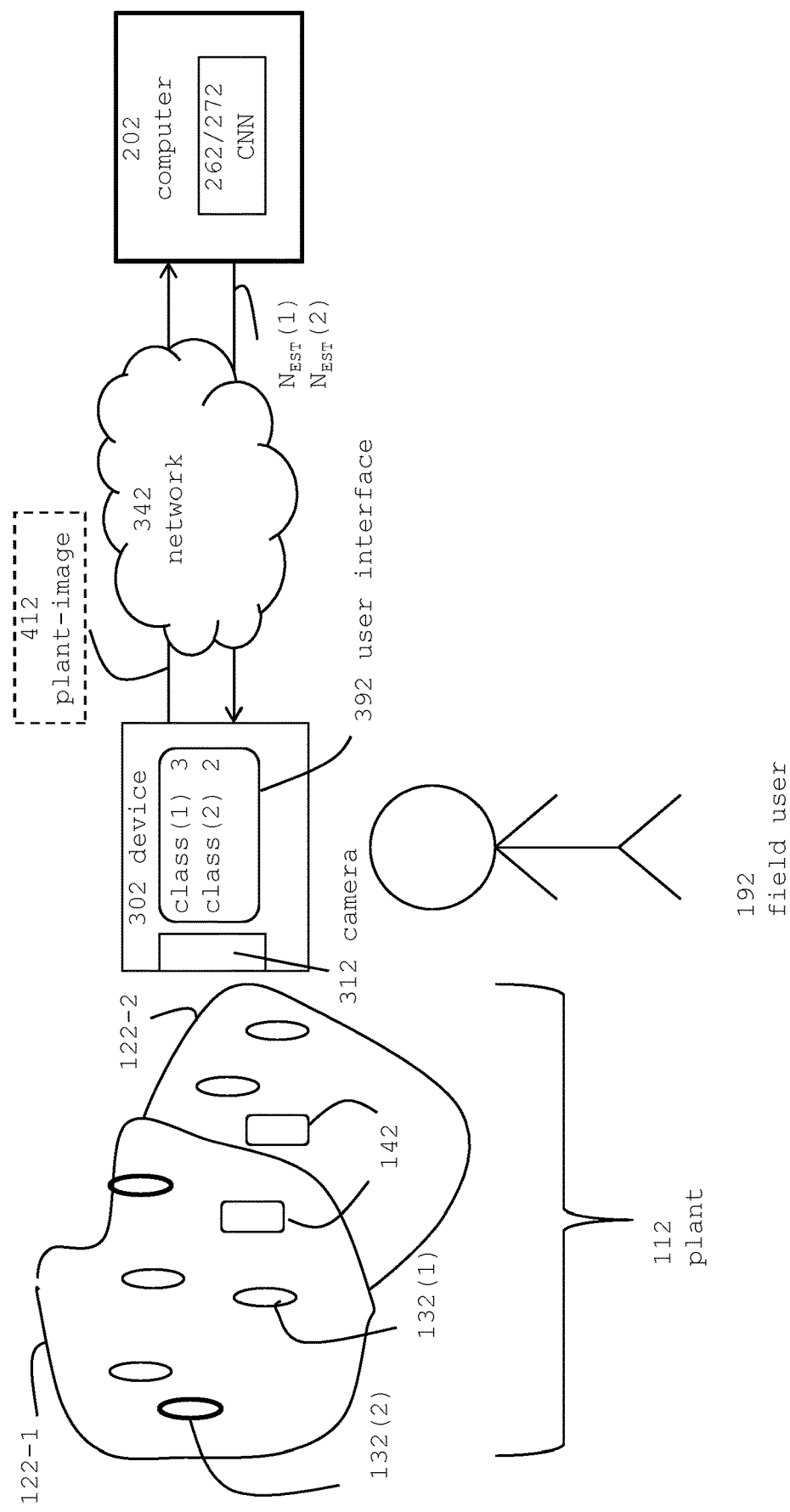
FIG. 2 illustrates an overview to a computer-implemented approach to count insects on leaves during a production phase.
Figure 3:
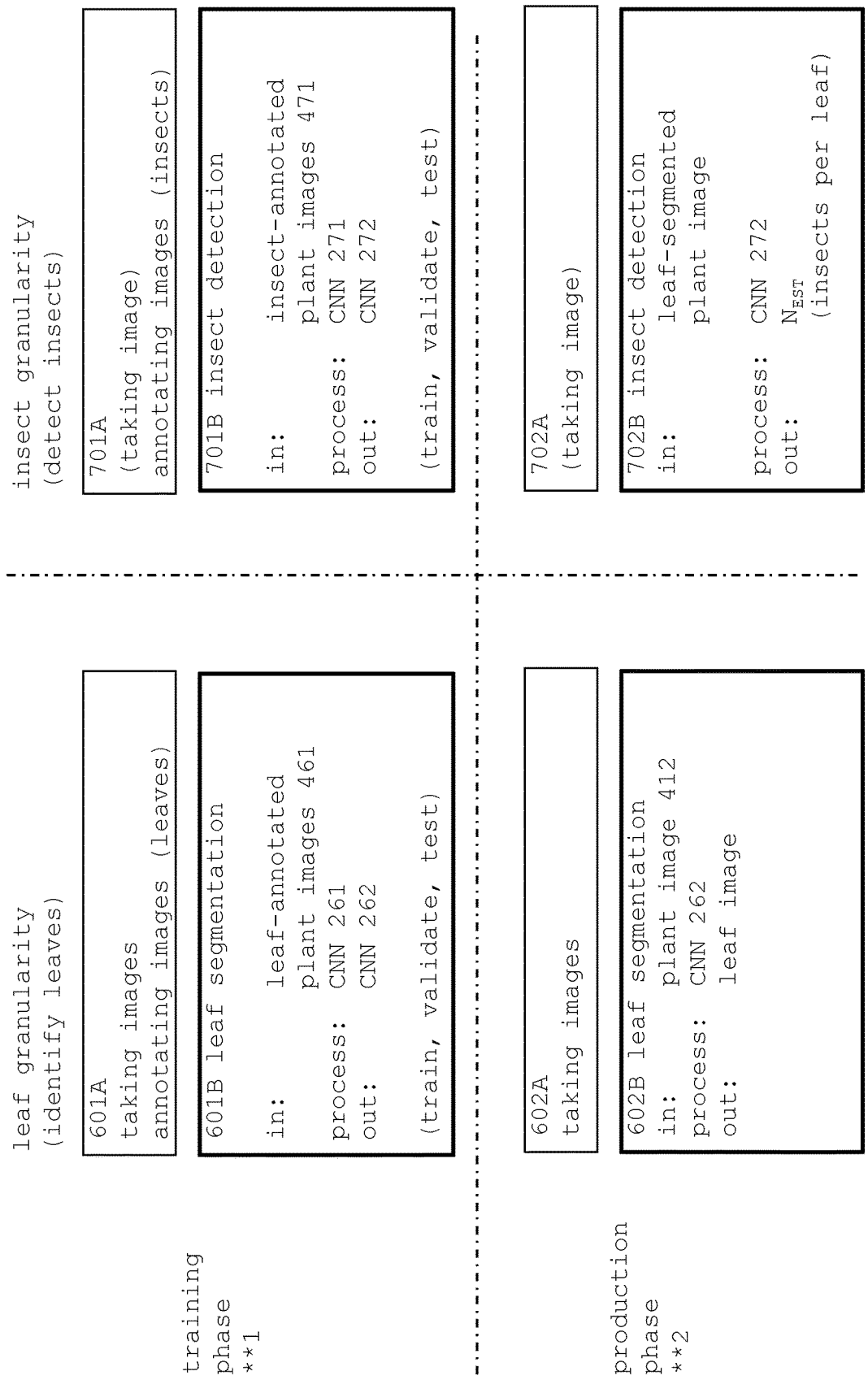
FIG. 3 illustrates an overview of computer-implemented methods.
Figure 4:
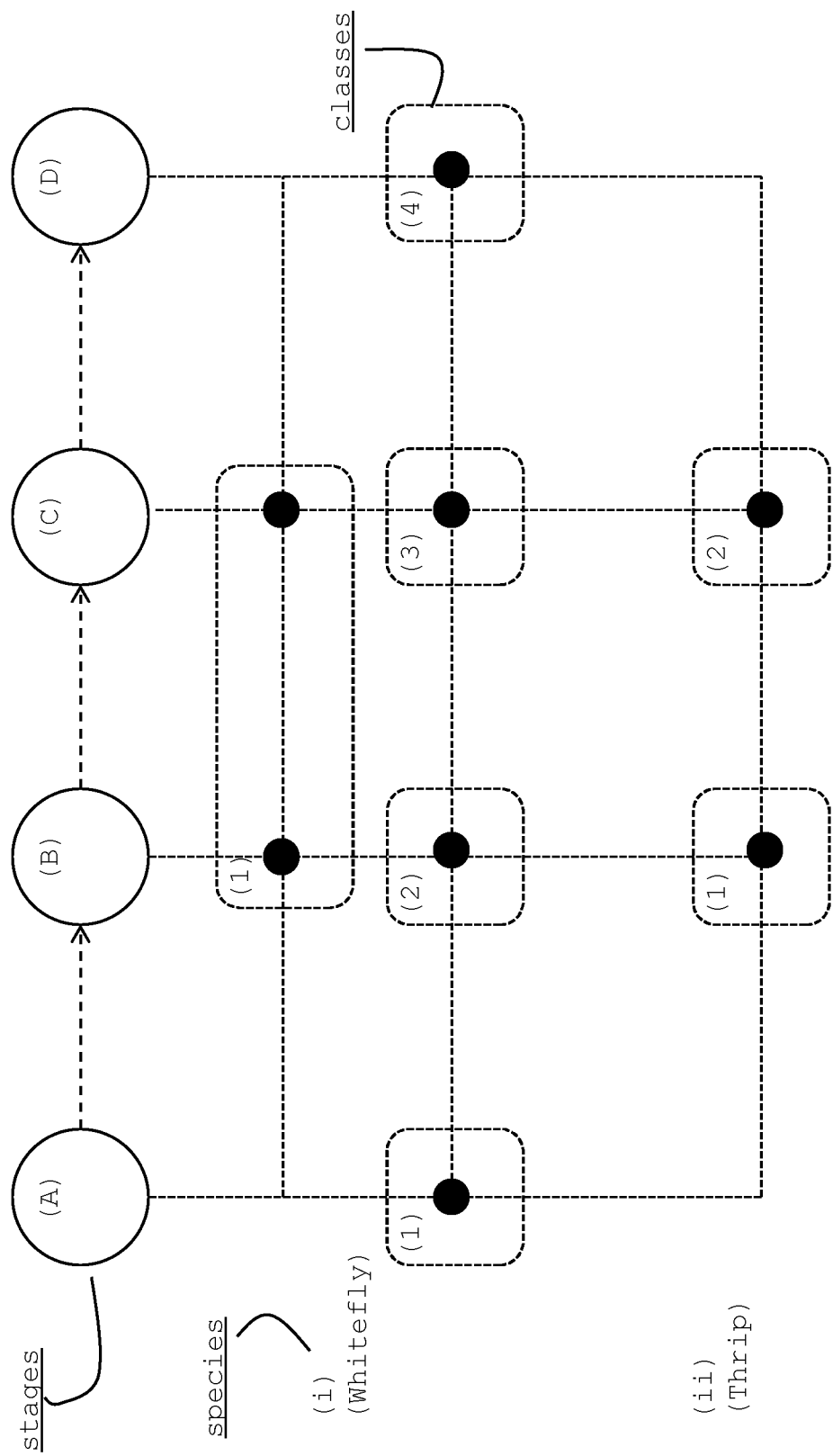
FIG. 4 illustrates a diagram with insect development stages, insect species, and counting classes.

Referring to FIGS. 1-3, the description provides an overview to the application of CNNs in two phases, and thereby introduces pre-processing activities as well as computer-implemented methods. Referring to FIG. 4, the description introduces insects in different development stages to be counted. Referring to FIGS. 5-12, the description investigates details (regarding plants, images, image portions to be processed). With FIG. 13, the description discusses accuracy.

Overview to Training and Production Phases

FIGS. 1-3 illustrate overviews to computer-implemented approaches
- as in FIG. 1, to train convolutional neural networks (CNN) to count insects on leaves in a training phase **\*\*1**, and
- as in FIG. 2, to quantify infestation by actually counting insects on leaves during a (subsequent) production phase **\*\*2 (FIG. 2**).

Throughout this description, references noted as **\*\*1/\*\*2** stand for elements that are similar but that have different use in both phases.

From left to right, FIGS. 1-2 illustrate plants 111/112 (with leaves and insects), cameras 311/312 to take plant-images 411/412, and computers 201/202 with CNNs to perform computer-implemented methods 601B/602B/701B/702B. The figures also illustrate human users 191/192.

FIGS. 1-2 illustrate computers 201/202 by rectangles with bold frames. Computers 201/202 implement methods 601B, 602B, 701B and 702B (FIG. 3) by techniques that are based on Machine Learning (ML). FIGS. 1-2 also illustrate computer 301 and mobile device 302, performing auxiliary activities (or participating therein), such as
taking images,
transmitting images,
receiving annotations, and
forwarding results to other computers, such as estimation values.

Some of the auxiliary activities are pre-processing activities that prepare method executions. In FIG. 3, the pre-processing activities are illustrated by references 601A, 602A, 701A and 702A.

Computers 201/202 use CNNs and other modules to be explained below (such as user interfaces, databases, splitter and combiner modules etc.). While FIGS. 1-2 just introduce the CNNs, the other figures provide details for pre-processing images and for setting parameters to the CNNs. CNNs 261 and 271 are being trained in the training phase **\*\*1 to become trained CNNs 272 and 272**, respectively. In other words, the difference between untrained and trained CNNs is the availability of parameters obtained through training.

FIG. 3 illustrates an overview to computer-implemented methods 601B, 602B, 701B and 702B. The methods are illustrated in a matrix. In general, counting insects on leaves is divided into a sequence, with simplified:

a first sub-sequence (illustrated by the column on the left side) to identify leaves on images, and a second sub-sequence (illustrated by the column on the right side), to count the insects on the identified leaves.

FIG. 3 differentiates pre-processing activities 601A, 602A, 701A, and 702A (such as taking images and annotating images) from computer-implemented methods 601B, 602B, 701B, and 702B with machine-learning techniques.

Methods 601B and 602B are performed with CNNs 261/262, and methods 701B and 702B are performed with CNNs 271/272. CNNs 261/262 and CNNs 271/272 differ from each other by parameters (explained below).

The CNNs use density map estimation techniques, where—simplified—the integral of the pixel values leads to the estimated insect numbers. In other words, counting is performed by calculating an integral. The estimated numbers $N_{EST}$ can be non-integer numbers. For the above-mentioned purpose (to identify appropriate countermeasures against the infestation), the accuracy of $N_{EST}$ is sufficient.

Using density maps to count objects is explained by "Lempitsky, V., Zisserman, A., 2010. Learning To Count Objects in Images. Neural Inf. Process. Syst. 1-9."

Training Phase

Training phase **1 is illustrated in the first row of FIG. 3 in reference to FIG. 1.

As illustrated by pre-processing 601A, camera 311 takes a plurality of plant-images 411 (in an image acquisition campaign). Computer 301 interacts with expert user 191 to obtain leaf-annotations and to obtain insect-annotations. User 191 can have different roles (details in FIG. 6). Combinations of images and annotations are provided as annotated images 461, 471. For convenience, the description differentiates leaf-annotated plant-images 461 and insect-annotated leaf-images 471. It is however noted that a particular image can have both leaf-annotations and insect-annotations.

Computer 301 forwards annotated images 461, 471 to computer 201.

In performing computer-implemented method 601B, computer 201 (FIG. 1) receives the plurality of plant-images in combination with the leaf-annotations (collectively "leaf-annotated plant-images"). Computer 201 then uses a sub-set of the plurality and trains CNN 261 to identify a particular leaf in a plant-image (that is not annotated). Thereby, computer 201 converts un-trained CNN 261 into trained CNN 262. In other words, CNN 262 is the output of computer 201.

In performing method 701B, computer 201 receives the plurality of leaf-annotated plant-images in combination with insect-annotations (collectively "insect-annotated leaf-images"). Computer 201 then trains CNN 271 to count insects on particular leaves. Thereby, computer 201 turns un-trained CNN 271 into trained CNN 272. In other words, CNN 272 is output of computer 201 as well.

It is noted that the description assumes the annotations to be made for the same plurality of plant-images 411. This is convenient, but not required. The pluralities can be different. For example, the plurality of plant-images 411 to be leaf-annotated can show non-infested plants. Using leaf-annotated images 471 (from such healthy plants) to further provide insect-annotations would fail because there would be no insects to annotate. Providing insect-annotations could be performed for images that are not segmented to leaves.

Production Phase

Production phase **2 is illustrated in the second row of FIG. 3, in reference to FIG. 2.

As illustrated by pre-processing 602A, camera 312 of device 302 takes plant-image 412 and forwards it to computer 202.

In performing method 602B, computer 202 (FIG. 2) uses CNN 262 to identify a particular leaf (and thereby creates a leaf-image). Subsequently, in performing method 702B, computer 202 uses CNN 272 and processes leaf-image 422. Thereby, computer 202 counts insects (and potentially other objects if trained accordingly) on that particular leaf. Thereby, computer 202 obtains the estimated number of insects per leaf $N_{EST}$ as the result.

In scientific literature, using trained CNNs to obtain results is occasionally called "testing".

The description now explains further aspects and implementation details, again in view of FIGS. 1-2.

Training Phase with Details

Returning to FIG. 1, it illustrates plant 111. Plant 111 has leaves 121, and leaves 121 are occupied by insects 131 and non-insect objects 141. Plant 111 can be a land-plant (not a water-plant). Camera 311 takes (a plurality of) plant-images 411 that are processed in computer 201 during training phase **1.

Training phase **1 has two sub-phases.

Figure 6:
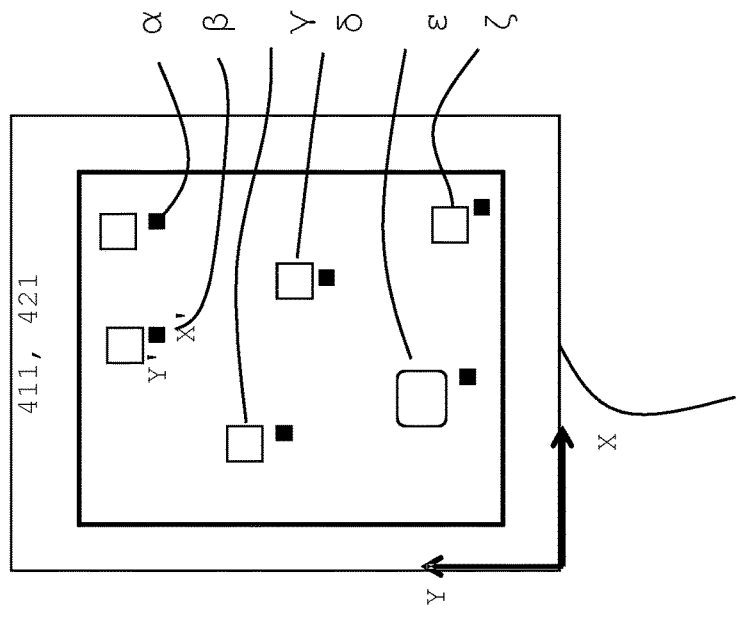
FIG. 6 illustrates a user interface of a computer as well as an expert user who annotates images.
Figure 6:
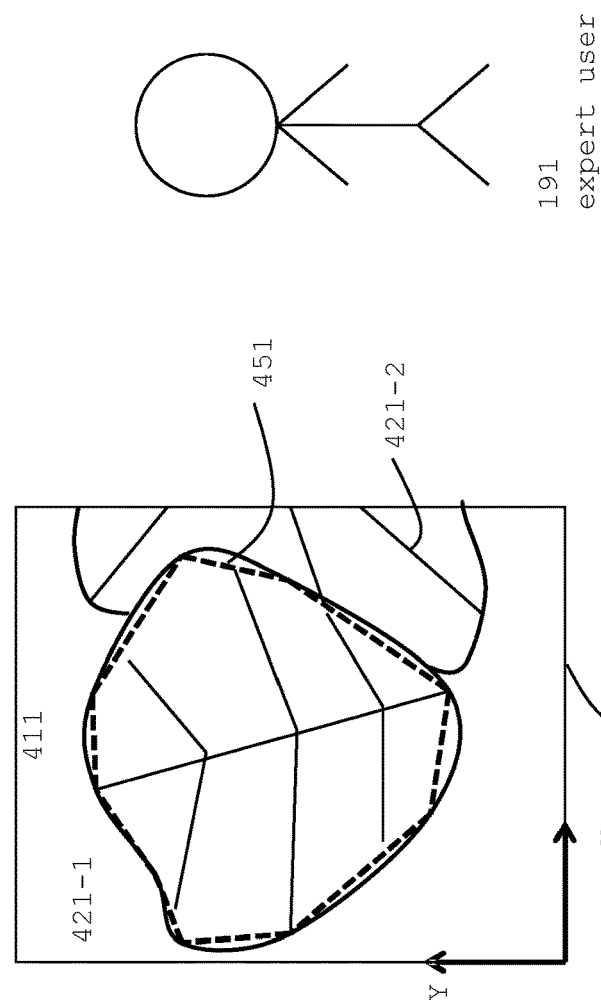

The first sub-phase comprises activities such as taking the plurality of plant-images 411, letting expert user 191 provide annotations to plant-images 411 to computer 301. There are annotations specific to the leaves, and there are annotations specific to the insects. Computer 301 receiving annotations results in annotated images 461, 471 that are leaf-annotated images and insect-annotated images (FIG. 6). Receiving annotations can also be considered as the supervised learning part.

In the second sub-phase, computer 201 then uses annotated images 461, 471 to train CNN 261 to identify a main leaf (i.e. a semantic segmentation of the plant image) and to train CNN 271 to identify the insects (i.e., on the main leaf that was identified earlier). Persons of skill in the art can apply suitable training settings.

Although computer 201 is illustrated by a single box, it can be implemented by separate physical computers. The same principle applies for plant 111 and for camera 311. The plant and the camera do not have to be the same for all images. It is rather expected to have plant-images 411 from cameras 311 with different properties. Also, the plurality of images 411 represents a plurality of plants 111. There is no need for a one-to-one relation, so one particular plant may be represented by multiple images.

Training the CNNs can be seen as the transition from the training phase to the production phase. As in FIG. 1, CNNs 261 and 271 are being trained to become trained-CNNs 262 and 272.

There is no need to copy the CNNs (quasi from figure to figure). The person of skill in the art can take over parameters from one network to another, such as from CNN 261 (of FIG. 1) to CNN 262 (of FIG. 2) and from CNN 271 (of FIG. 1) to CNN 272 of (FIG. 2).

As in FIG. 1, a progress of time can be seen from left to right. It does not matter if during training phase 1, plant 111 remains alive; data communication goes into one direction only. However, in the production phase 2 to be explained with FIG. 2, timing is of vital importance for plant 112, in the real sense of the word, because the output from trained-CNNs 262, 272 is information used to treat plant 112 (or its neighbors on the field).

Training phase 1 is usually performed once, in supervised learning with expert user 191. The setting for the training phase with camera 311 taking plant-images 411 (as reference images), with expert user 191 annotating plant-images 411 (or derivatives thereof) and with computer-implemented processing will be explained. The description assumes that training phase 1 has been completed before production phase 2. It is however possible to perform training phase 1 continuously and in parallel to production phase **2.

Production Phase with Details

Returning to FIG. 2, it illustrates an overview of a computer-implemented approach by that a computer—illustrated as computer 202—counts insects 132 on leaves 122 of plants 112 in an exemplary application in an agricultural field. It does not matter if the field is located in open air or located in a green-house.

Simplified, computer 202 processes plant-image 412 received from mobile device 302 through communication network 342. In difference to training phase **1 of FIG. 1, one image 412 is theoretically enough.

Leaves 122 are so-called "infested leaves" because insects are located on them. Counting can be differentiated for insects of particular class 132(1) (illustrated by plain ovals) and—optionally—of particular class 132(2) (bold ovals). Optionally, counting can consider further classes (cf. FIGS. 4 and 11).

Non-insect objects 142 are not necessarily to be counted. Such objects 142 can be located within the leaf and can be structural elements of leaves 122, such as damages on the leaf, shining effects due to light reflection or the like. It is noted that many insects camouflage themselves. Therefore, for the computer it might be difficult to differentiate insects 132 and non-insect objects 142.

Insect classes (1) and (2) are defined
by a particular insect species, and (i.e., logical AND)
by a particular development stage (cf. FIGS. 2 and 4).

Figure 11A:
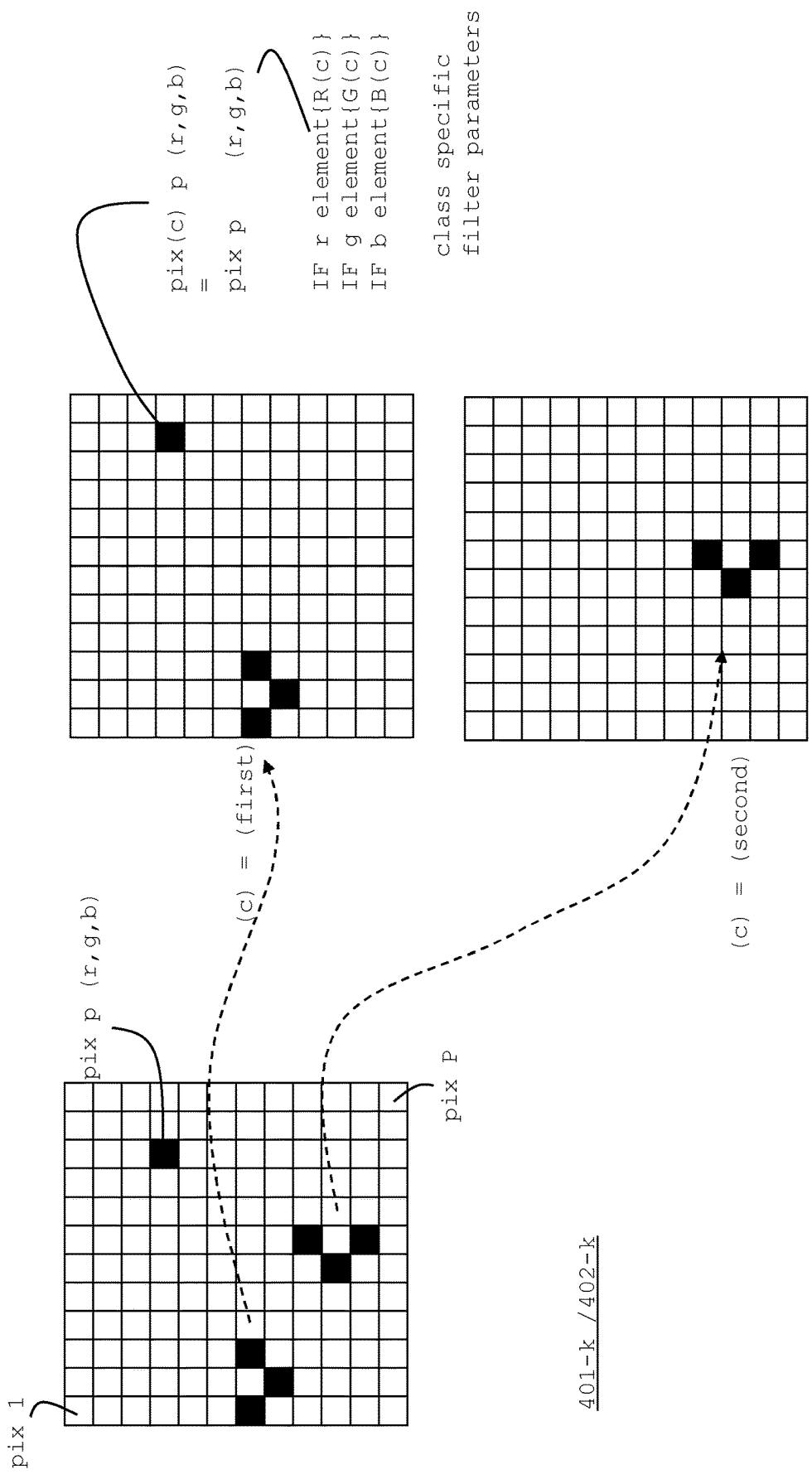
FIGS. 11A and 11B illustrate a pixel value filter that is implemented as part of a CNN layer in implementations that differentiate more than two insect classes.
Figure 11B:
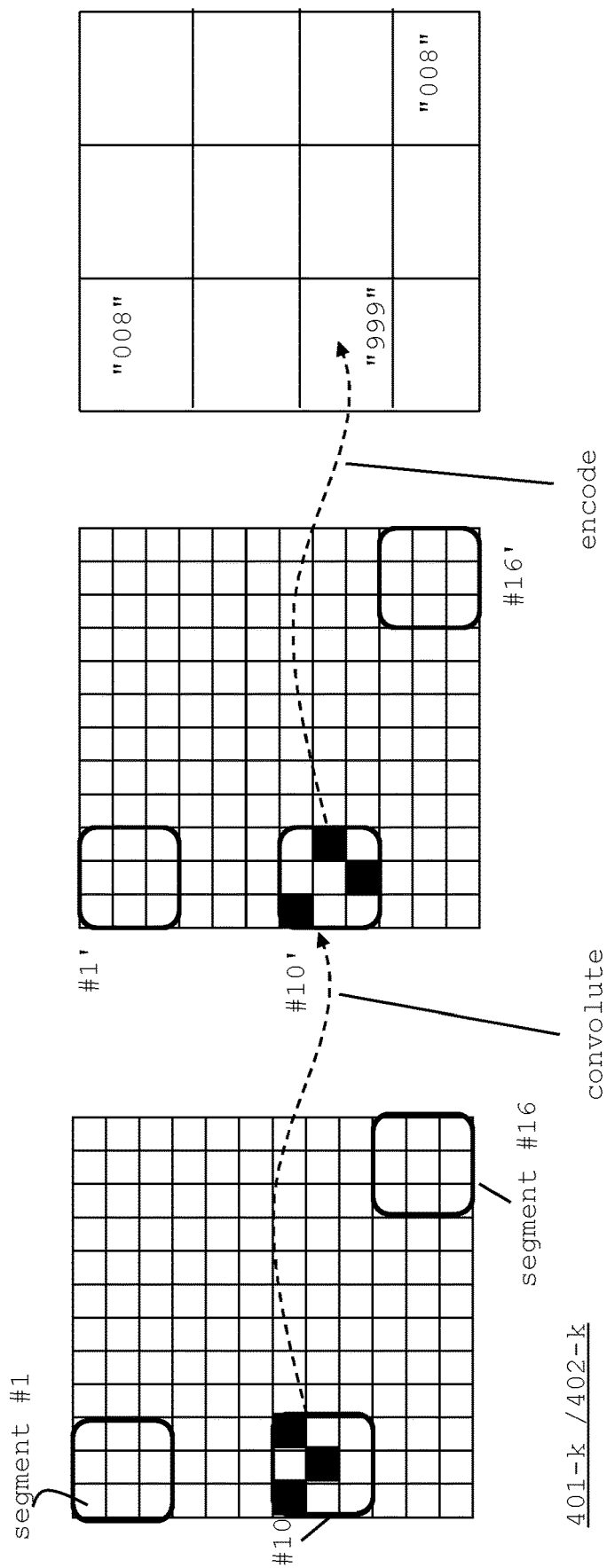
Figure 12:
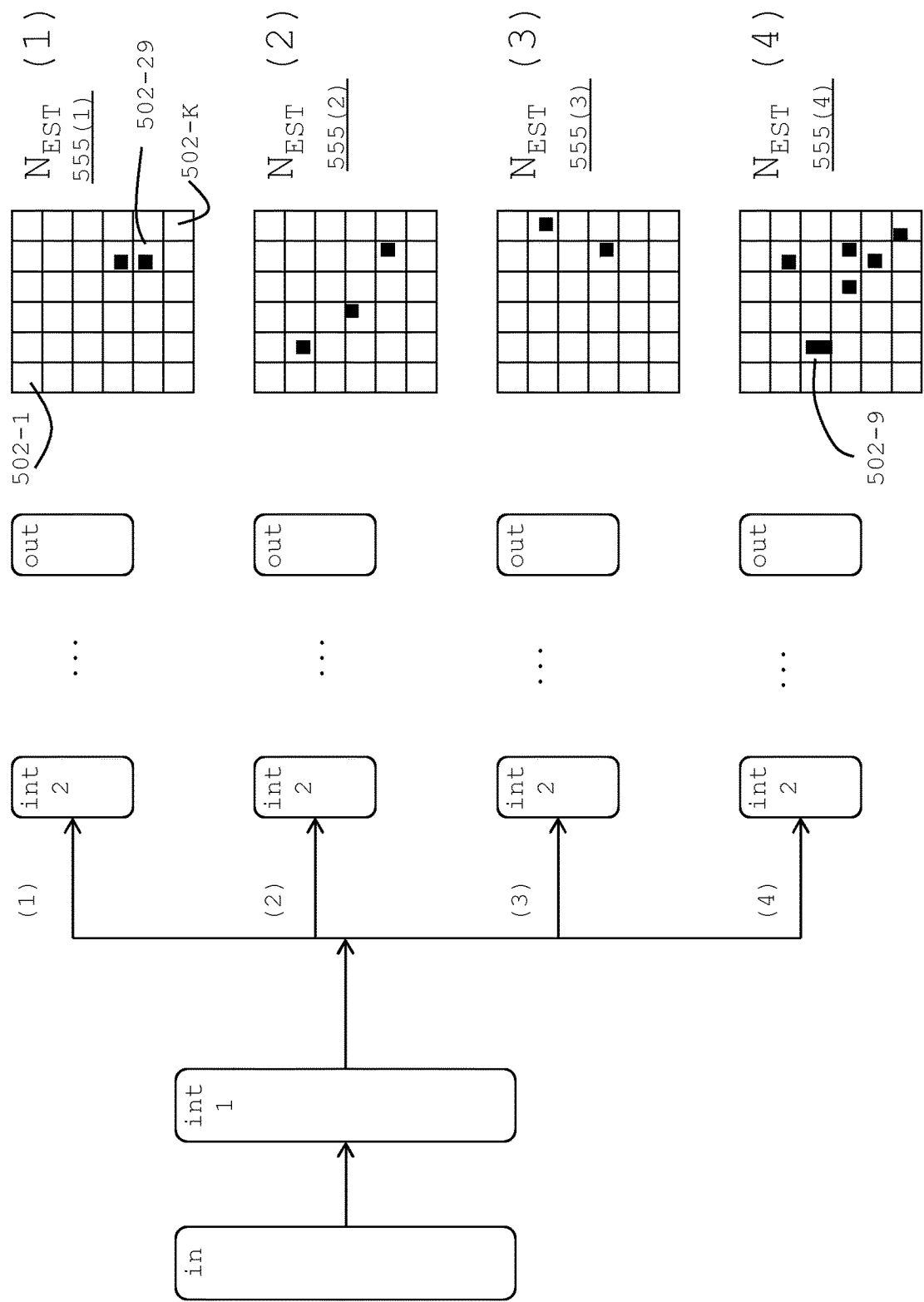
FIG. 12 illustrates a CNN with multiple output channels.

A more fine-tuned granularity with more classes is given in FIG. 4, and an adaptation of the CNNs to such granularity is given in FIGS. 11-12. As used herein, the term "insect" is used synonymous to "bug".

Plant 112 has a plurality of leaves 122. For simplicity, only two leaves 122-1 and 122-2 are illustrated. Leaves 122 are occupied by insects 132 (there is no difference to the training phase **1). For convenience, FIG. 2 is not scaled, with the size of the insects being out of proportion. Field user 192—for example the farmer who is growing plant 112—uses camera 312 of mobile device 302 to take an image of plant 112 (plant-image 412). For mobile devices having two (or more) cameras, camera 312 is conveniently the camera with the highest resolution.

Mobile device 302 can be seen as a combination of an image device (i.e. camera 312), processor and memory. Mobile device 302 is readily available to the farmers, for example as a so-called "smartphone" or as a "tablet". Of course, mobile device 302 can be regarded as a "computer". It is noted that mobile device 302 participate in auxiliary activities (cf. FIG. 3, 602A, 702A) only.

Field user 192 tries to catch at least one complete leaf (here leaf 122-1) into (at least one) plant-image 412. In other words, field user 192 just makes a photo of the plant. Thereby, field user 192 may look at user interface 392 (i.e. at the visual user-interface of device 302) that displays the plant that is located in front of camera 312.

Mobile device 302 then forwards plant-image 412 via communication network 342 to computer 202. As the illustration of communication network 342 suggests, computer 202 can be implemented remotely from mobile device 302.

Computer 202 returns a result that is displayed to user interface 392 (of mobile device 302). In the much simplified example of this figure, there are N(1)=3 insects of class (1) (i.e., insects 132(1)) and N(2)=2 insects of class (2) (i.e., insects 132(2)) counted. The numbers N(1), N(2) (or N in general) are numbers-per-leaf, not numbers per plant (here in the example for main leaf 122-1). The numbers correspond to $N_{EST}$ (with $N_{EST}$ being rounded to the nearest integer N).

Optionally, by proving infestation data that is separated by classes (such as (1) and (2)), field user 192 can identify countermeasures to combat infestation with better expectation of success.

The term "main leaf" does not imply any hierarchy with the leaves on the plant, but simply stands for that particular leaf for that the insects are counted. Adjacent leaf 122-2 is an example of a leaf that is located close to main leaf 122-1, but for that insects are not to be counted. Although illustrated in singular, plant 112 has one main leaf but multiple adjacent leaves. It is assumed that plant-image 412 represents the main leaf completely, and represents the adjacent leaves only partially. This is convenient for explanation, but not required.

It is usual that main leaf 122-1 is on top of adjacent leaf 122-2 (or leaves). They overlap each other and it is difficult to identify the edges between one from the other.

Accuracy: False Positives, False Negatives

The numbers N are derived from estimated numbers $N_{EST}$, the description describes an approach to accurately determine N.

Ideally, only insects 132 located on main leaf 122-1 are counted. Insects 132 that are not counted but that are located on main leaf 122-1 would be considered to be "false negatives", and insects that are counted but that are located on an adjacent leaf would be considered to be "false positives". As it will be explained with more detail below, counting comprises two major sub-processes:

first, differentiating main and adjacent leaves (also called leaf identification, segmentation)
second, counting the insects on the main leaf only.

In other words, identifying the main leaf prior to counting keeps the number of "false negatives" and "false positives" negligible.

Implementation

The communication between mobile device 302 and computer 202 via communication network 342 can be implemented by techniques that are available and that are commercially offered by communication providers.

Figure 10:
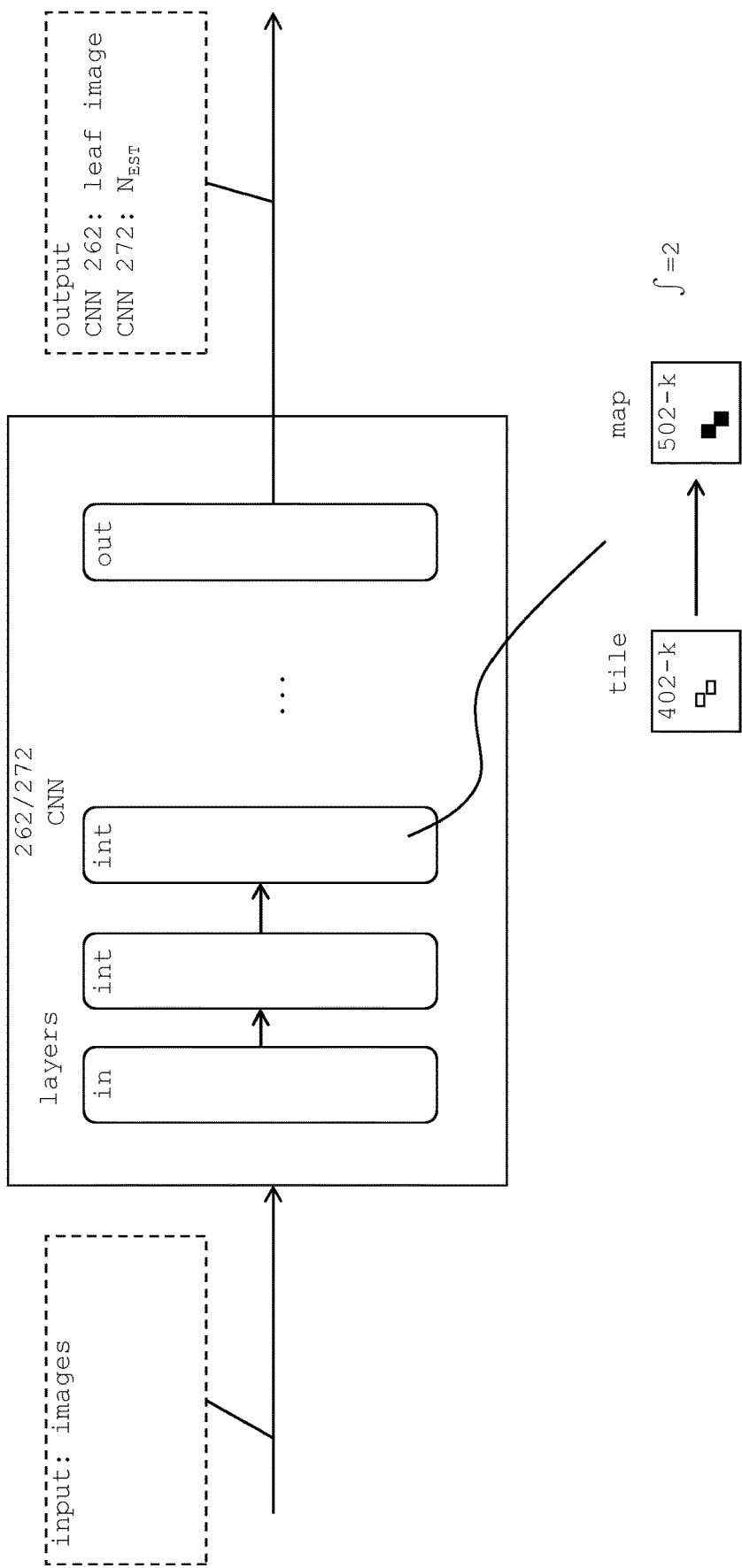
FIG. 10 illustrates a CNN with layers, in a general overview.

Computer 202 has CNN 262/272 that performs computer-implemented method 602B and 602B (details in connections with FIG. 10). CNNs 262 and 272 have been trained before (methods 601B and 701B).

In an embodiment, computers 201/202 use operating system (OS) Linux, and the module that executes methods 601B/602B, 701B/702B was implemented by software in the Python programming language. It is convenient to implement the modules by a virtualization with containers. Appropriate software is commercially available, for example, from Docker Inc. (San Francisco, California, US). In a software-as-a-service (SaaS) implementation, mobile device 302 acts as the client, and computer 202 acts as the server.

Besides CNNs 262/272, computer 202 has other modules, for example, a well-known REST API (Representational State Transfer, Application Programming Interface) to implement the communication between mobile device 302 and computer 202 can use. Computer 202 appears to mobile device 302 as a web-service. The person of skill in the art can apply other settings.

The time it takes computer 202 with CNNs 262/272 (performing the method) to obtain $N_{EST}$ depends on the resolution of plant-image 412. Performing methods 602B and 702B may take a couple of seconds. The processing time rises with the resolution of the image. (The processing time has been measured in test runs. For plant-image 412 with 4000×6000 pixels, the processing time was approximately 9 seconds.)

It is convenient, to transmit plant-image 412 in its original pixel resolution, otherwise the accuracy to count insects will deteriorate. In other words, there are many techniques to transmit images in reduced resolutions, but for this application, such techniques should be ignored here. However, transmitting a compressed image (in a loss-less format) can be possible. In modern communication networks, the bandwidth consumption (for transmitting the image in original resolution) is no problem any longer.

It is noted that for field user 192, the conditions for catching images are not always ideal. For example, there are variations in the acquisition distance (between camera and plant, users holding the mobile devices at different heights), the illumination (e.g., sunny daylight or rainy/cloudy daylight, some leaves may shadow other leaves), the surface of the plant (e.g., dust or rain-drops on the plant etc.), perspective (e.g., taking images from the side or from the top to name two extremes), focusing (e.g., sharp image for non-relevant parts of the plant), resolution (e.g., mobile devices with 24 M pixel cameras, versus devices with less pixels), and soon.

Insects, Plants and Use Cases

In the following, the description shortly investigates the objects to be counted: insects 131/132 (cf. FIGS. 1-2), but then turns to a discussion of problems with existing technology and of solution approach that is adapted to count insects.

The description uses two examples of plant/insect combinations.

In a first combination, plants 111/112 are eggplants (*Solanum melongena*, EPPO-code SOLME) and insects 131/132 are of the species whitefly (*Bemisia tabaci* EPPO-code BEMITA).

In a second combination, plants 111/112 are eggplants as well, and insects 131/132 are of the species thrips (*Frankliniella occidentalis*, EPPO-code FRANOC).

It is noted that the person of skill in the art can differentiate such (and other combinations) without further explanations herein. Taking images, annotating images, training the CNNs, counting insects (cf. pre-processing and method execution in FIG. 3) are usually made for one of the combinations.

Exceptions from the general rule are available. Having different plant species in the training phase **\*\*1 and the production phase \*\*2 can be possible if the plants are similar in appearance. In that case pre-processing 601A and executing method 601B (i.e. to train CNN 261/262 to segment leaves) would be performed with a first plant species (e.g., eggplant) and pre-processing 602A and executing method 602B** would be performed with a second plant species. The second plant species can belong to other crops such as for example cotton, soy bean, cabbage, maize (i.e., corn).

Since the infestation is made by the insects, the description focuses on the insects. It is a constraint that insects change appearance in the so-called metamorphosis with a sequence of development stages.

Granularity to Quantify Infestation

As the accuracy in obtaining data regarding infestation is related to the efforts to obtain the data, the description now introduces granularity aspects.

FIG. 4 illustrates a diagram with development stages (A), (B), (C) and (D) for insects 131/132 (cf. FIGS. 1-2), insect species (i) and (ii), and counting classes (1), (2), (3), (4)

As illustrated by arrows (from left to right), the development stages occur in a predefined sequence with state transitions: from stage (A) to (B), from (B) to (C), from (C) to (D). The arrows are dashed, just to illustrate that other transitions (such as from (B) to (D)) are possible. Biologists can associate the stages with semantics relating to the age of the insects, such as "egg", "nymph", "adult", "empty pupae" (an insect has left the pupa and only the skin of the pupa is left), with semantics relating to life and death. As particular way to express stages is the "n1n2"/"n3n4" nomenclature, well known in the art.

Details for the appearance in each stage are well-known. Just to mention one point, insects can develop wings. For example, the presence or absence of wings can indicate particular development stage for thrips.

Below the stages, FIG. 4 illustrates a stage-to-species matrix, with stages (A) to (D) in columns, and insect species (i) and (ii) in rows.

In the example there are two species: (i) "whitefly" and (ii) "thrips". Insects of both species develop through the (A) to (D) stages (of course separately: (i) do not turn into (ii) or vice versa). The black dots at the column/row crossings indicate that insects of particular stage/species combinations should be counted. This is a compromise between accuracy (e.g. infestation critical for black dotted situations, but countermeasures available) and efforts (annotations, calculations, training etc.).

Rectangles group the particular stage/species combinations into classes (1) to (4) and thereby differentiate use cases 1 to 3.

For each particular use case, the following assumptions applies:

In the training phase **\*\*1, expert users 191** can annotate insects in the particular stage/species combinations on plant-images (or leaf-images) and the CNN can be trained with such annotations.

In the production phase, computer 202 with CNN 272 can count the insects accordingly.

The description explains use cases by example:

In use case 1, CNN 271/272 is trained to provide $N_{EST}$ as the number of species (i) insects in stages (B) and (C), without differentiating (B) and (C), that is $N_{EST}$ (i)(B)(C)

In use case 2, CNN 271/272 is trained to provide $N_{EST}$ in 2 separate numbers (cf. the introduction in FIGS. 1-2):

$N_{EST}$ (ii) (B)

$N_{EST}$ (ii) (C)

In use case 3, CNN 271/272 is trained to provide $N_{EST}$ in 4 separate numbers:

$N_{EST}$ (i) (A)

$N_{EST}$ (i) (B)

$N_{EST}$ (i) (C)

$N_{EST}$ (i) (D)

The rectangles are illustrated with class numbers (1) to (4), wherein the classes are just alternative notations. The description will explain adaptations to the CNNs for multi-class use cases (use cases 2 and 3) in connection with FIGS. 11-12.

Constraints Related to Insects

The description now refers to some challenges, but in combination with solution approaches.

The impact of the insects to the plant (as well as the appropriate countermeasures) can be different for each development stage. For example, it may be important to determine the number of nymphs (per leaf), the number of empty pupae and so on. Differentiating between young and old nymphs can indicate the time interval that has passed since the arrival of the insects, with the opportunity to fine-tune the countermeasure. For example, adults may lay eggs (and that should be prevented).

Figure 5:
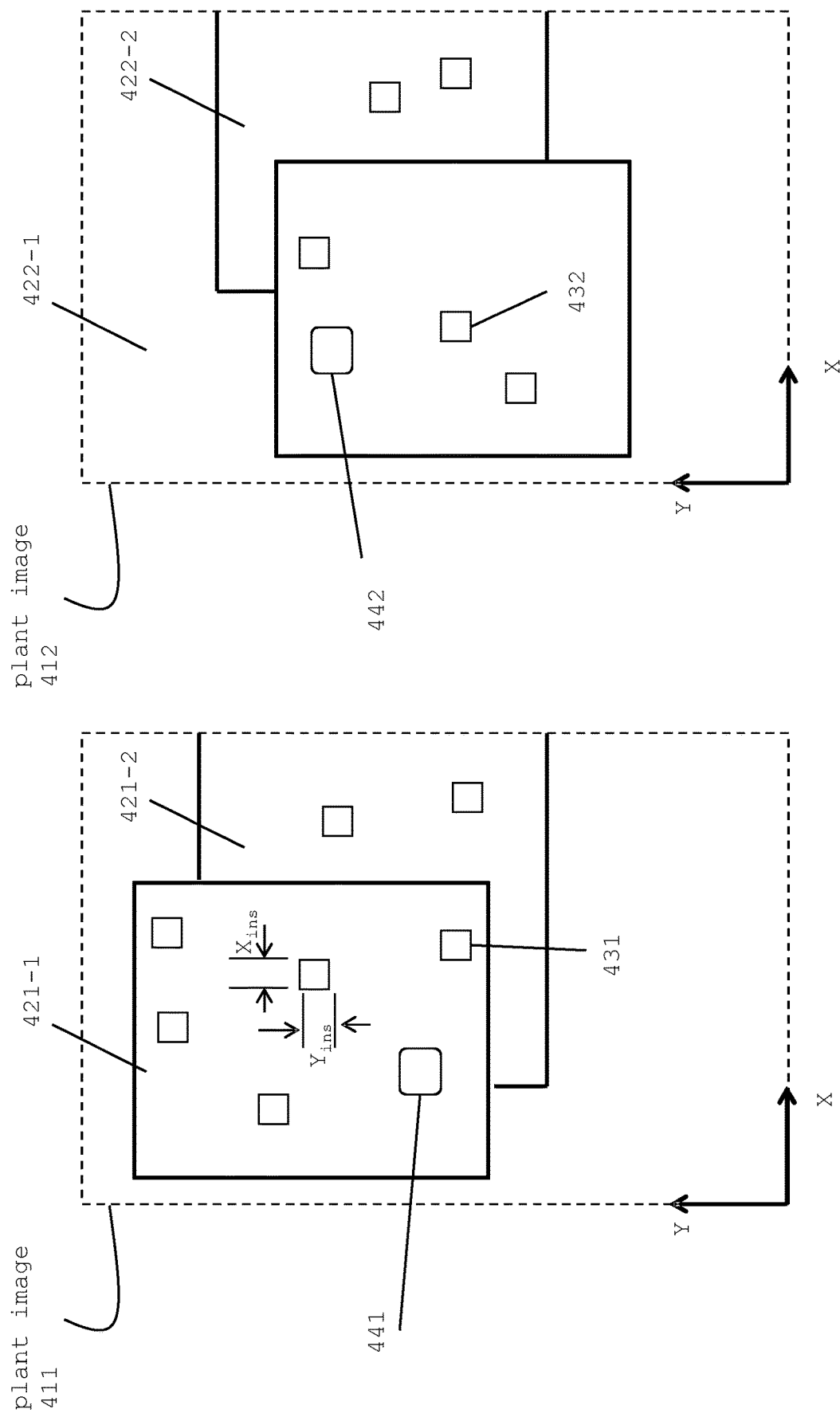
FIG. 5 illustrates a plant-image showing a particular plant with leaves and insects.

FIG. 5 illustrates plant-image 411/412 (dashed frame, cf. FIGS. 1-2). Plant-image 411/412 shows a particular plant with leaves 421/422 and with insects 431/432. FIG. 5 is simplified and uses symbols for the leaves (without illustrating the characteristic leaf shape). Leaf 421-1 corresponds to leaf 121-1 (of FIG. 1) and leaf 421-2 corresponds to leaf 121-2 (of FIG. 1), illustrated partly. Leaf 422-1 corresponds to leaf 122-1 (of FIG. 1) and the leaf 422-2 corresponds to leaf 122-2 (of FIG. 2), illustrated partly as well.

FIG. 5 illustrates insects 431/432 by small squares, there are some of them on leaf 421-1/422-1 and some of them on leaf 421-2/422-2. Non-insect object 441/442 is symbolized by a small square with round corners. Although not illustrated here by the symbols in this figure, the insects can belong to different classes (cf. FIG. 4).

It is noted that the spatial arrangement (i.e. pixel coordinates (X, Y)) of the leaves, the insects and the non-insect objects is different from image to image. The reason is simple: the images show different physical plants (even taken at different time points).

The description uses terms such as "insect 431/432" and "non-insect object 441/442" for convenience of explanation. It is however noted that FIG. 5 illustrates an image (being a data-structure) so that "insect 431/432" actually symbolizes the pixels that show the insect (likewise for 441/442).

For use in training phase **1, plant-image 411 (cf. FIG. 1) can be taken by a high-resolution camera (e.g., 24 mega pixel) or by a main camera of a mobile device.

Although illustrated here as a single image, in training phase **1, images are taken in pluralities. It is noted that the variety of different cameras can be taken into account when taking images for training.

In the production phase, plant-image 412 is usually taken by camera 312 of mobile device 302 (cf. FIG. 2). FIG. 5 is also convenient to explain constraints that arise from the objects (i.e., plants with leaves and insects) and from insufficiencies of mobile device cameras.

FIG. 5 illustrates image 411/412 in portrait orientation (height larger than width), this is convenient but not required. Image coordinates (X, Y) to identify particular pixels are given for convenience. Image dimensions are discussed in terms of pixels. For example, image 411/412 can have 6000 pixels in the Y coordinate, and 4000 pixels in the X coordinate (i.e. 24 Mega Pixels, or "24 M"). The pixel numbers are the property of the camera sensor and can vary.

Image 411/412 is usually a three-channel color image, with the color usually coded in the RGB color space (i.e., red, green and blue).

It is noted that image 412 does not have to be displayed to field user 192. Also, the field scenario will be explained for a single image 412, but in practice it might be advisable for field user 192 to take a couple of similar images 412.

Image 412 represents reality (i.e. plant 112, leaves 122, insects 132, non-insect objects 142), but with at least the following further constraints.

As mentioned already, plant 111/112 has multiple leaves at separate physical locations. Therefore in image 411/412, one leaf can overlay other leaves. Or in other words, while in reality (cf. FIG. 1), leaves are separate, leaf 421-1 and leaf 421-2 appear as adjacent leaves (422-1 and 422-2 as well).

However, with the goal to count N as "insect in a particular class per leaf", the overlay must be considered. As multiple leaves have similar color (usually, green color), their representations in plant-image 411/412 appear in the same color (i.e., small or zero color difference in the image).

Further, each insect of a particular class has a particular color. This color could be called text-book color, or standard color. For example, as the name suggests, an adult whitefly is white (at least in most parts).

However, the image would not properly represent the text-book color. There are at least the following reasons for that:

The color of the insect has a natural variability.
The illumination can be different (e.g., cloudy sky, sunny sky, shadow and so on)
Camera 311/312 is not an ideal camera. It does not take such different illumination conditions into account. As a consequence, the images may not properly show the color.

In the coding of the image (the numerical values that represent color, e.g., in the mentioned RGB space), the numerical values would be different. Therefore, the absolute value (of the color) in the image is therefore NOT particular characterizing.

Due to the mentioned camouflage, it can be complicated to differentiate insect 131/132 from non-insect object 141/142. This is complicated in nature and even more complicated in images.

Further, insects can be relatively tiny in comparison to the leaves. For example, an insect can be smaller than one millimeter in length. In contrast to the emphasis in FIGS. 1-2, a couple of hundred insects may occupy a single leaf easily. The insects are also usually relative tiny things for the human eye to detect. This is in sharp contrast to, for example, a single bee in the petal leaves of a flower.

FIG. 5 symbolizes the dimensions of insects 431/432. For example, an insect is shown by approximately $Y_{ins}=30$ pixels and approximately $X_{ins}=20$ pixels (i.e., approximately 600 pixels only).

Further, it is natural behavior of the insects to sit on the leaf close to each other. In other words, insects tend to be present on the leaf in pairs (i.e., two insects), or even in triples (i.e., three insects). So in other words, a 30×20 pixel portion of image 411/412 might represent two or more insects.

The pixel numbers 20×30 are exemplary numbers, but it can be assumed that insects 431/432 are dimensioned with two-digit pixel numbers (i.e. up to 99 pixels in each of the two coordinates). The same limitations can be true for non-insect objects 441/442.

As it will be explained, CNNs 271/272 (to count insects) use density map estimation (instead of the above-mentioned traditional object detection). In density maps, insects would be represented as areas, and the integral of the pixel values of the area would be approximately 1 (assuming that the pixel values are real numbers, normalized between 0 and 1, and also assuming to have one insect per map). It is noted that for situations in that two insects are located close together and overlapping on the image, there would be a single area, but the sum of the pixel values would be approximately 2.

It is noted that insects of two or more stages can be available on a single leaf at the same time. It is a constraint that the differences between two stages can be subtle. For example, on a leaf in reality, insects in stages (C) and (D) may look similar.

As a consequence, a computer using a conventional computer-vision technique (such as the mentioned technique with feature extraction) may not recognize the differences. However, an expert user can see differences (on images), and training images can be properly annotated (cf. use case 1).

Constraints Related to Mobile Devices

There are also constraints related to mobile device 302 (cf. FIG. 1).

First, mobile devices (and their camera optics) are optimized to take photos of humans, not of insects. The tiny insects appear on the image as spots (cf. $X_{ins}$ pixel×$Y_{ins}$ pixel).

Second, today's mobile devices may not have sufficient computing resources to perform image processing with the goal to count the insects per leaf.

Third, using mobile devices for obtaining annotated images and in the function of computer 201 (cf. FIG. 1) is potentially not suitable. The display of computer 302 (if a mobile device) might be too small and the processing power (in terms of CPU, GPU) might be insufficient.

Further, the farmer (i.e. the user of the mobile device) requires a result shortly after taking the image. To be more accurate: the time interval from taking the image to determining the insect-number-per-leaf must be negligible so that
the insects do not substantially grow (and/or reproduce, and/or eventually change progress to the next development stage) during that time interval,
the insects do no fly away (because the measures are applied to the infested plants).

The identification and the application of the countermeasures can only start when the insect-number-per-lead has been established. A countermeasure—although properly identified—may be applied too late to be effective. For example, a countermeasure that is specialized to destroy eggs would not have any effect if the insects have already hatched from the eggs (cf. stage specific countermeasures).

The following is taken into account by the solution. The species of the plant is usually known (for example, the farmer knows eggplant) so that the computer has the information (as an attribute of the image). Therefore, the plant species is therefore not further discussed here.

Annotating Images as a Pre-Processing Activity

FIG. 6 illustrates a user interface of computer 301 (cf. FIG. 1). FIG. 6 also illustrates expert user 191 annotating images. Thereby, FIG. 6 explains some of the pre-processing activities (cf. FIG. 3, 601A and 701A) in training phase **1. In other words, FIG. 6 is related to supervised learning.

Those of skill in the art can implement the interaction between computer 301 and expert user 191 by appropriate user interfaces, for example with a display showing images and with interface elements to identify parts of the image (e.g., touch-screen, mouse, keyboard etc.). Software tools for such and other annotations are known in the art. A convenient tool "LabelMe" is described by Russel, B. C., Torralba, A., Murphy, K. P., Freeman, W. T., 2008. 2008 LabelMe. Int. J. Comput. Vis. 77, 157-173. doi:10.5591/978-1-57735-516-8/IJCAI11-407.

FIG. 6 gives more details how to obtain annotated images 461, 471 introduced above in connection with FIGS. 1-3. The coordinate system (X, Y) is given for convenience (cf. FIG. 5).

Expert user 191 conveys ground truth information to the images, not only regarding the presence or absence of a main leaf (by the leaf-annotations), or the presence or absences of particular insects (by the insect-annotations), but also information regarding the position of the main leaf and of the insect in terms of (X, Y) coordinates. Depending on the selected granularity of the use cases (cf. FIG. 4), the annotations can also identify insect species, development stages and so on.

Both annotation processes (leaf annotations, insect annotations) can be performed independently, and even the expertise of user 191 can be different. For both stages, user 191 rather assumes particular roles:
the role of a plant expert who can read images to recognize leaves with their borders, and
the role of an insect expert who can read images to differentiate insects (and/or non-insects) according to classes.

Although FIG. 6 illustrates single image 411, annotating is repeated, for example for 1.947 images (leaf annotation). In view of that number, it is noted that expert user 191 is not necessarily always the same person.

The description now explains details for each type of annotation separately:

Leaf Annotation

As illustrated on the left side of FIG. 6, expert user 191 annotates plant-image 411 to obtain leaf-annotated plant-image 461. The leaf-annotation identifies the leaf border of the main leaf 421-1 in difference to adjacent leaf 421-2. In implementations, user 191 can draw polygon 451 (dashed line) around that part of plant-image 411 that shows the complete leaf (i.e. the main leaf). In the example, image 411 shows leaf 420-1 as the complete leaf, and shows leaf 420-2 only partially, cf. FIG. 5. It is convenient to display polygon 451 to expert user 191, but this is not required. Computer 301 can close polygon 451 automatically. Instead of polygons, the person of skill in the art can use other user interfaces, for example picture processing tools to manipulate images, for example, by "erasing" the pixels surrounding the main leaf.

The leaf-annotation allows computer 201 (cf. FIG. 1) for each pixel of plant-image 411 to differentiate if the pixel belongs to the main leaf or not. This differentiation is relevant for performing method 601B (cf. FIG. 3, leaf segmentation).

For the leaf-annotation, it does not matter if the leaf shows insects (or non-insect objects).

Insect Annotation

As illustrated on the right side of FIG. 6, user 191 also annotates leaf-image 421 (cf. FIG. 7) to obtain insect-annotated leaf-image 471. The insect annotation identifies insects and—optionally—identifies insect classes (cf. species and/or stages, as explained by the classes in FIG. 4). The term "insect-annotated" is simplified: image 471 can comprise annotations for the non-insect objects are well.

The insect annotation also identifies the position of the insects (and/or non-insect objects) by coordinates.

It is noted that the annotations can take the use cases (cf. FIG. 4) into account. In the example of FIG. 6 (right side), the annotations are illustrated by dots with references a to ζ, with—for example— annotation α pointing to a whitefly (i) in stage (C);
annotation β pointing to a whitefly (i) in stage (B);
annotations γ and δ pointing to whiteflies (i) in stage (B);
annotation ε pointing to a non-insect object, being an optional annotation; and
annotation ζ pointing to thrips (ii) in stage (B), but differentiating stages would also be possible.

Expert user 191 can actually set the dots next (or above) to the insects. As used herein, a single dot points to a particular single pixel (the "dot pixel" or "annotation pixel"). The coordinate of that single pixel at position coordinate (X', Y') of an insect (or non-insect object) is communicated to computer 301. FIG. 6 illustrates the position coordinate for annotation β, by way of example. The user interface can display the dot by multiple pixels, but the position is recorded by the coordinates at pixel accuracy.

Computer 301 stores the position coordinates as part of the annotation. Coordinates (X', Y') can be regarded as annotation coordinates, and the computer would also store the semantic, such as (i)(C) in annotation 1, as (i)(B) in annotation β and so on.

As it will be explained further, the insect-annotation (for a particular image 411) is used by computer 201 in training CNN 271, for example, by letting the computer convolute images (i.e., tiles of images) with kernel functions that are centered at the position coordinate (X', Y'). Also, the insect-annotation comprises ground truth data regarding the number of insects (optionally in the granularity of the use cases of FIG. 4).

The annotations can be embedded in an annotated image by dots (in color coding, e.g. red for stage (C), stage (D), or as X, Y coordinates separately.

Using dot annotations is convenient, because the (X, Y) coordinates of the annotations indicate where the insects are shown on the image.

Leaf-Images

Figure 7:
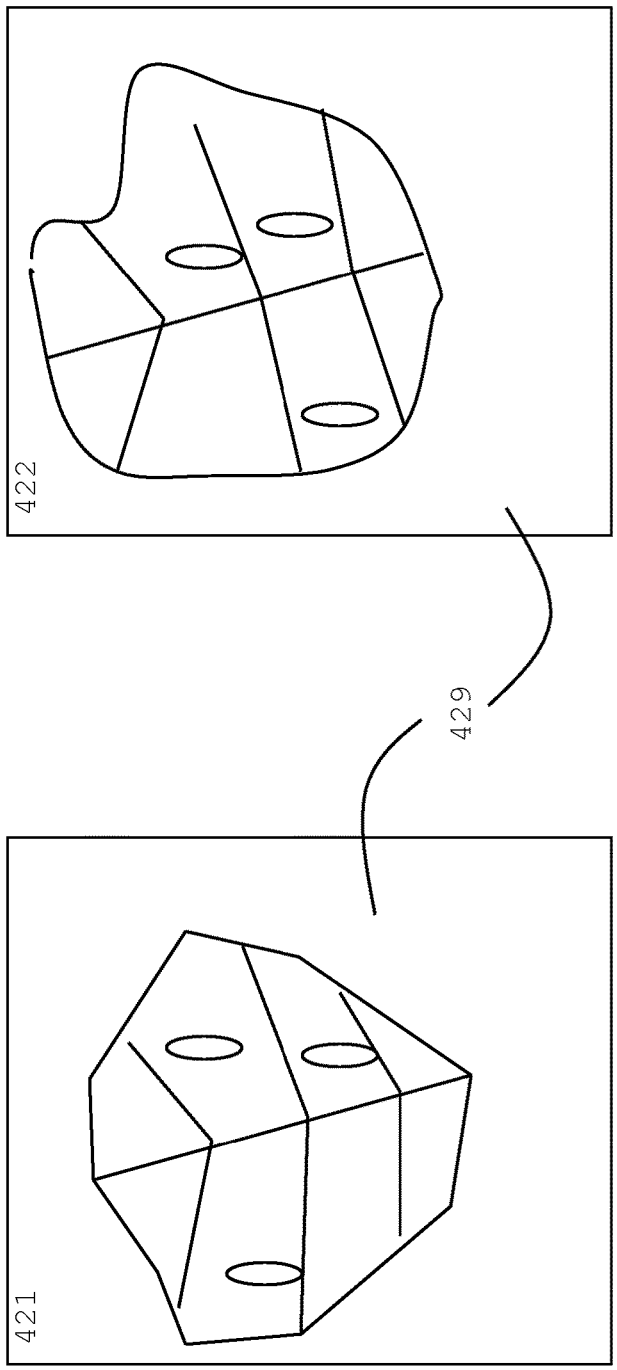
FIG. 7 illustrates a leaf-image.

FIG. 7 illustrates leaf-image 421/422. Leaf-image 421/422 shows a particular plant with its main leaf and with insects. In difference to plant-image 411/412, leaf-image 421/422 only shows the main leaf, but not the adjacent leaves. The way to obtain leaf-image 421 and 422 can differ, as described in the following:

In training phase \*\*1, computer 201 obtains leaf-image 421 through interaction with expert user 191, as explained below (cf. FIG. 6, left side). Leaf-image 421 can be considered as the portion of leaf-annotated plant-image 461 that shows the leaf. Leaf-image 421 is illustrated here for explanation only. As explained in connection with FIG. 3, computer 201 processes the plurality of leaf-annotated plant-images 461 to obtain CNN 262, this process uses the annotations.

In the production phase, computer 202 obtains leaf-image 422 through segmenting plant-image 412 by using (trained) CNN 262 (in method 602B). In the production phase, annotations are not available. It is noted that leaf-image 422 (production phase) is not the same as leaf-image 421 (training phase).

Reference 429 illustrates portions of leaf image 421/422 that do not show the main leaf. The pixels in portions 429 can be ignored in subsequence processing steps. For example, a processing step by that an image is split into tiles does not have to be performed for portions 429 (because insects are not to be counted according to the insects per leaf definition. In implementations, these portions 429 can be represented by pixels having a particular color or otherwise. In illustrations (or optionally in displaying portions 429 to users), the portions can be for example displayed in black or white or other single-color (e.g., white as in FIG. 7).

Splitting and Re-Combining Images

Figure 8:
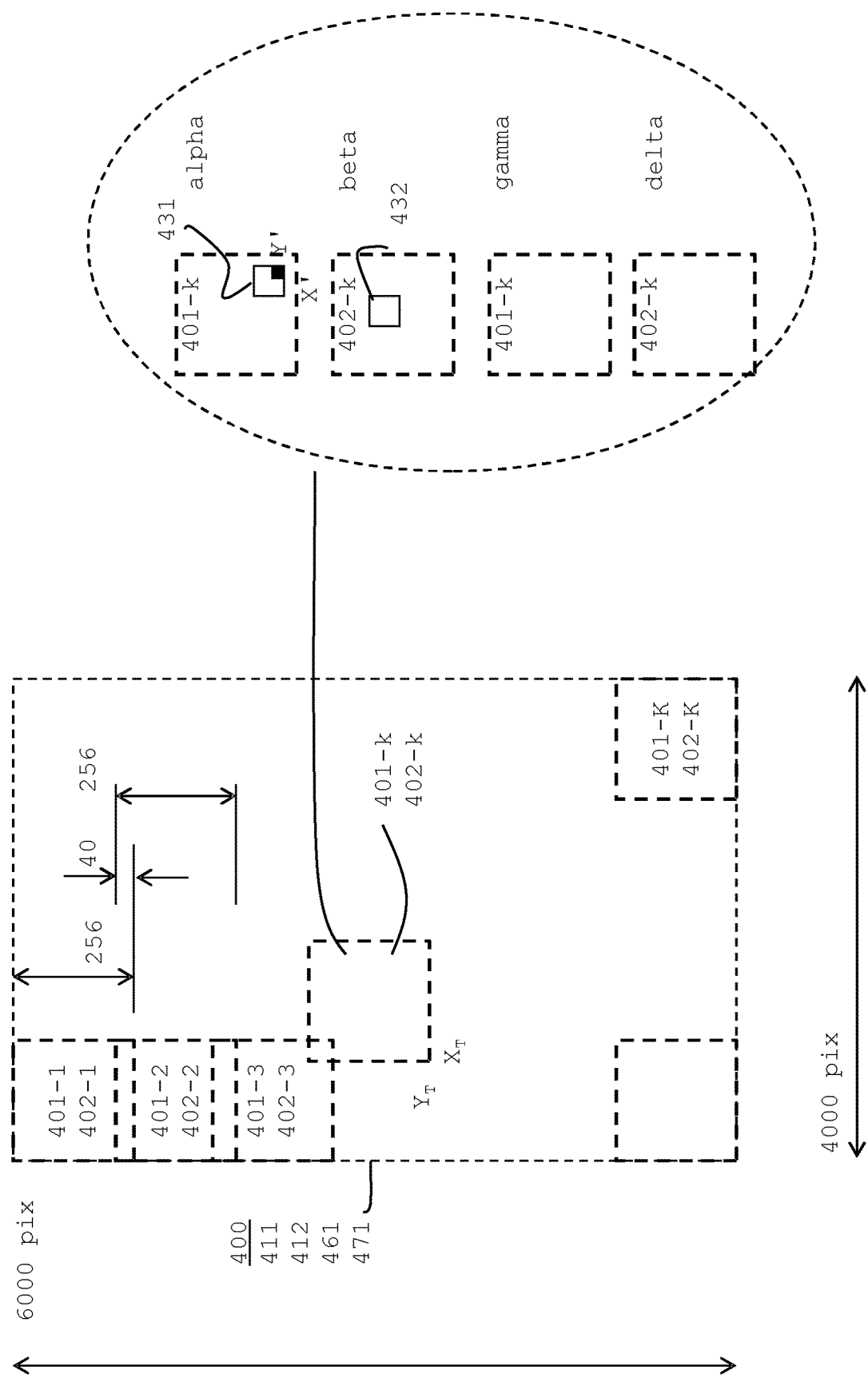
FIG. 8 illustrates an image being split into tiles or sub-regions.

FIG. 8 illustrates image 401/402 being split into tiles 401-k/402-k (or sub-regions). The image can be
 plant-image 411 (training phase), annotated as image 461 or as image 471, leading to tiles 401-k, or
 plant-image 412 (production phase), leading to tiles 402-k.

The number of tiles 401-k/402-k in image 401/402 is given be reference K. In the example, image 400 can have an image dimension of 4000×6000 pixels (annotations do not change the dimension). The tiles have tile dimensions that are smaller than the image dimensions. For example, the tile dimension is 256×256 pixels. The tile dimensions correspond to the dimension of the input layer of the CNNs (cf. FIG. 10). Other tile/input dimensions are also possible (e.g. 224×224 pixels). Taking overlap into account (e.g., overlap by 40 pixels, as illustrated), the number of tiles can be up to K=396.

The figure illustrates particular tiles 401-k/402-k in a close-up view on the right side, with examples:

In the example alpha, tile 401-k was split out from annotated image 471. Therefore, annotations are applicable for tile 401-k as well. For example, if an annotation indicates the presence of insect 431 for a particular (X', Y') coordinate, tile 401-k comprises the pixel with that particular coordinate and tile 401-k takes over this annotation (cf. the dot symbol, with position coordinates (X', Y') cf. FIG. 6). The person of skill in the art can consider the different coordinate bases (cf. FIG. 6 for the complete image, FIG. 8 for a tile only).

During training, CNN 271 would learn parameters to obtain density map 501-k with the integral summing up to 1 (corresponding to 1 insect, assuming normalization of the pixel values in the density maps). For example, CNN 271 would take the position coordinate (X', Y') to be the center for applying a kernel function to all pixels of tile 401-k.

In the example beta, tile 402-k was split from image 412 (production phase), it shows insect 432. Of course, the insect is not necessarily at the same position as in "annotated" tile 401-k above in alpha). Using the learned parameters, CNN 272 would arrive at density map 502-k with integral 1.

The example gamma is a variation of the example alpha. Tile 401-k was split up, and annotations are de facto available as well. Although expert user 192 did not provide annotations (dots or the like), the meta-data indicates the absence of an insect. During training, CNN 271 would learn parameters to obtain density map 501-k with the integral summing up to 0.

The example delta is a variation of case beta. A non-insect tile 402-k is processed in the production phase (by CNN 272) and it would arrive at a density map with integral 0.

It is noted that—in the production phase—the density maps are provided for all tiles 402-k (k=1 to K). The person of skill in the art can implement this, for example, by operating CNN 272 in K repetitions (i.e. one run per tile), and combiner module 282 can reconstruct the density maps of the tiles in the same order as splitter module 242 has split them (cf. FIG. 9 for the modules).

Taking the Use Cases and the Classes into Account

While in FIG. 8, the examples alpha to gamma are explained to detect the presence (or absence) of insects (in tiles), the classes (introduced above) can be taken into account as well.

As explained above, expert user 192 can annotate images for different insect species (e.g., (i) and (ii)), development stages (for example (A) to (B), at least for the combinations highlighted in FIG. 4 with the black dots. Therefore, there can be specific tiles 401-$k$ for specific use cases.

Taking use case 3 as an example, there can be annotations for (i) (A), (i) (B), (i) (C), and (i) (D) (i.e. whitefly in four stages, classes (1) to (4)). In other words, the annotations are class specific.

This leads to different tiles 401-$k$ for these combinations (or classes). Density maps 501-$k$ (training phase) and 502-$k$ (production phase) are different as well, simply because images 411/412 are different. The integrals can be separately calculated for different insect classes, resulting in the $N_{EST}$ (for the complete image, after combination) specific for the classes (cf. FIGS. 11-12).

Figure 9:
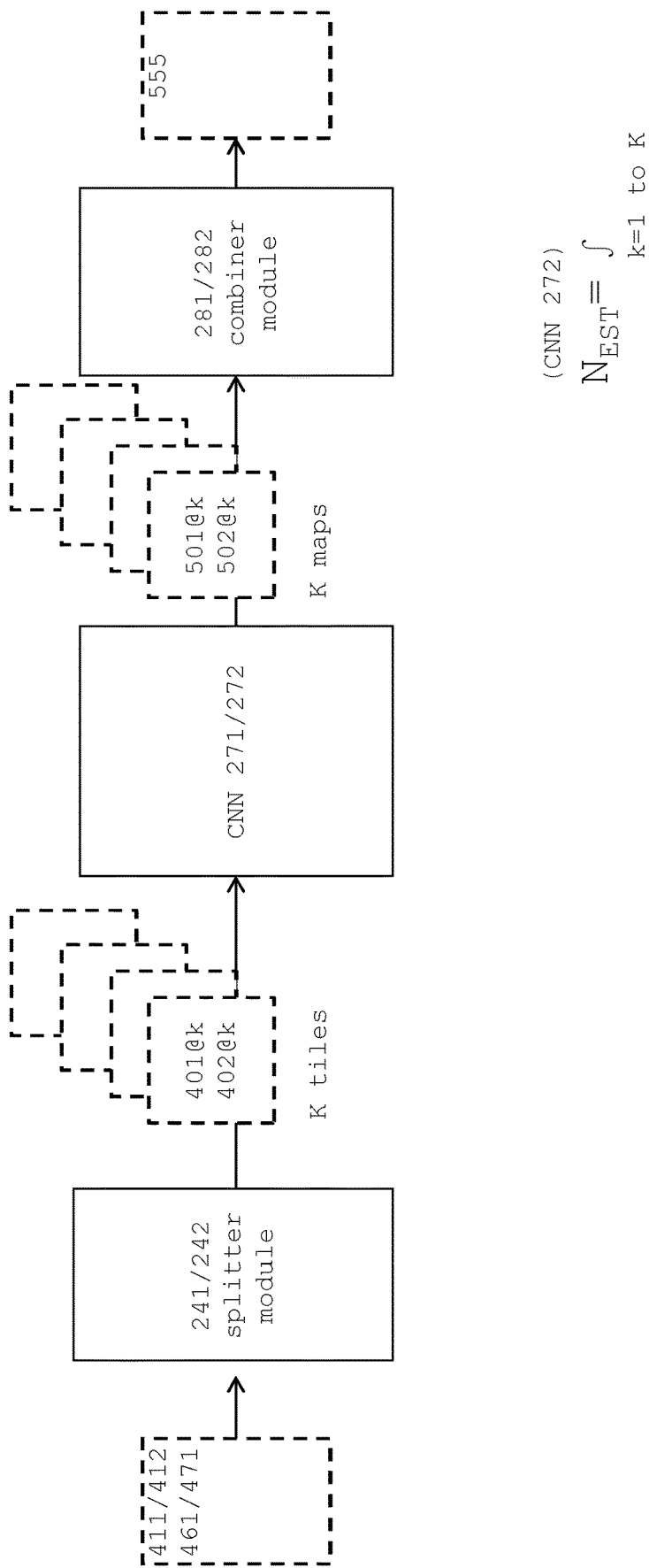
FIG. 9 illustrates a CNN with a splitter module at its input and with a combiner module at its output.

FIG. 9 illustrates CNN 271/272 with splitter module 241/242 and with combiner module 281/282.

Splitter module 241/242 receives images 411/412 (images 411 with annotations as images 461, 471) and provides tiles 401-$k$/402-$k$. As it will be explained, the CNNs provide density maps, combiner module 281/282 receives maps 501-$k$/502-$k$ and provides combined density map 555.

Since there is an overlap (cf. FIG. 8), combiner module 281/282 can compose the image (or combined density map) by overlapping likewise. Pixel values at the same particular coordinate (X, Y coordinates for the 4000×6000 pixels) are counted only once.

Combiner module 281/282 can also calculate the overall integral of the pixel values (of the combined density map), thus resulting in $N_{EST}$.

CNN Overview

FIG. 10 illustrates CNNs 261/262/271/272 with layers, in a general overview. The CNNs are implemented by collections of program routines being executed by a computer such as by computer 201/202. FIG. 10 illustrates the CNNs with the input to an input layer and with the output from an output layer. FIG. 10 also illustrates (at least symbolically) intermediate layers. CNNs 261/262/271/272 are deep networks because they have multiple intermediate layers. The intermediate layers are hidden. In other words, deep learning is applied here.

FIG. 10 also illustrates some parameters and illustrates intermediate images (being tiles and maps). Since CNNs are well known in the art, the description focuses on the parameters that are applied specially for segmenting by CNNs 261/262 and for counting by CNNs 271/272.

As already mentioned in connection with FIGS. 1-2, the CNNs receive images as input.

In training phase **1, CNNs 261/271 receive annotated images 461, 471 and turn un-trained CNN 261 into trained CNN 262 (using the leaf-annotated plant-images) and turn un-trained CNN 271 into trained CNN 272 (using insect-annotated leaf-images).

In the production phase, CNNs 262 and 272 receive plant-image 412 and provide output, such as $N_{EST}$ (i.e. the number of insects per leave).

The CNNs do not receive the images in the original image dimension (e.g., 4000×6000 pixels) but in tile/map dimensions (e.g., 224×224 pixels).

Density Map calculation

During processing, the CNNs obtain intermediate data. For convenience, FIG. 10 illustrates an example for intermediate data by intermediate images: tile 401/402-$k$ and density map 501-$k$/502-$k$. Index k is the tile index explained with FIGS. 8-9.

There is however no need to display the tiles and the maps to a user. FIG. 10 illustrates tile 402-$k$ that shows two insects. Tile 402-$k$ is a portion of a plant-image or a portion of a leaf-image and has tile dimensions optimized for processing by the CNN layers. In the example, tile 402-$k$ has 256×256 pixels (or 224×224 pixels in a different example). Tile 402-$k$ is obtained by splitting an image (details in connection with FIG. 8) to tiles.

Map 502-$k$ is a density map derived from tile 402-$k$. Map 502-$k$ has the same dimension as the tile 402-$k$. In other words, the map dimensions and the tile dimensions are corresponding to each other. The density map can be understood as a collection of single-color pixels in X-Y-coordinates, each having a numerical value V(X, Y). The integral of the values V of all X-Y-coordinates corresponds to the number of objects (i.e. insects). In the example, the integral is 2 (in an ideal case), corresponding to the number of insects (e.g., two insects shown in tile 402-$k$).

In the production phase 2, map 502-$k$ is obtained by prediction (with the parameters obtained during training). During the training phase 2, one of the processing steps is the application of a kernel function (e.g., a Gaussian kernel) with the kernel center corresponding to an annotation coordinate (X', Y'), if an annotation (for an insect) is available in the particular tile 402-$k$. In other words, during training the tiles with annotations are processed to normalized Gaussians. In the absence of annotations, kernel functions are not applied.

Since tile 402-$k$ is only a portion of the (complete) image (at the input of splitter 242), combiner module 282 (cf. FIG. 9) can sum up the integrals for the plurality of maps 502-$k$, leading to $N_{EST}$. Image overlap can be considered.

Converting tile 401-$k$ to map 501-$k$ is based on layer-specific parameters obtained by training (i.e., training CNN 271 to become CNN 272). Since the insect-annotations (cf. FIG. 6) indicate the presence (or absence) of an insect (or more insects as here), the annotations are also applicable to the (plurality of tiles). There are tiles with annotations (insects are present) and there are tiles without annotations (insects are not present).

In the example, tile 401-$k$ has the annotation "2 insects". It is noted that both insects can belong to different classes (cf. FIG. 4), the differentiation between classes (i.e. counting the insects in a class-specific approach) is explained in connection with class-branching (cf. FIGS. 11-12).

Networks are publicly available in a variety of implementations, and the networks are configured by configuration parameters.

The description shortly refers to input/output parameters in general as well as to configuration parameter (in connection with FIG. 10) and then specifies parameters in view of the approach to count insects. Occasionally, an existing network is being modified.

Types

Exemplary networks comprise the following network types (or "architectures"):

The UNet type is disclosed by Ronneberger, O., Fischer, P., Brox, T., 2015. U-net: Convolutional networks for biomedical image segmentation, in: Lecture Notes in Computer Science (Including Subseries Lecture Notes in Artificial Intelligence and Lecture Notes in Bioinformatics). pp. 234-241. doi:10.1007/978-3-319-24574-4_28

The DenseNet type is disclosed by Huang, G., Liu, Z., Van Der Maaten, L., Weinberger, K. Q., 2017. Densely connected convolutional networks, in: Proceedings—30th IEEE Conference on Computer Vision and Pattern Recognition, CVPR 2017. pp. 2261-2269. doi:10.1109/CVPR.2017.243

The Fully Convolutional Regression Network (FCRN) type is disclosed by Xie, W., Noble, J. A., Zisserman, A., Xie, W., Noble, J. A., Microscopy, A. Z., 2016. Computer Methods in Biomechanics and Biomedical Engineering: Imaging & Visualization Microscopy cell counting and detection with fully convolutional regression networks ABSTRACT. Comput. Methods Biomech. Biomed. Eng. IMaging Vis. 1163. doi:10.1080/21681163.2016.1149104

The modified FCRN type is based on the FCRN type, with modifications.

The CNNs have the following properties:

It is a fully convolutional model, being able to provide semantic segmentation in combination with pixel-by-pixel regression.

From the many functions of a CNN, the regression function is used during training to minimize the difference between the ground truth (i.e., number of insects according to annotations) and the number or insects estimated (i.e. $N_{EST}$). In other words, the difference is the loss function. Regression is known in the art and will be explained by example in FIG. 13.

The CNNs have been tested for implementations for the types UNet, DenseNet and FCRN (with modifications).

The following particulars are introduced (or used) by setting parameters accordingly (skilled person):

The last layer is an activation of the linear type.

The loss function is selected to be the mean absolute error (MAE).

The FCRN network (by Xie et al) was modified by the following:

Using dropout: During training, a layer is selected from that a given number of neuron nodes are excluded at random from further calculation. The number of such excluded neurons is pre-defined, for example by a percentage (i.e., a dropout parameter).

Using two additional layers to an encoding part (i.e., an encoder), and using two additional layers in a corresponding decoding part (i.e. a decoder): The additional layers are added by means of up-sampling procedures. The additional layers implement filter function and encoding/decoding functions with further explanations in FIGS. 11A and 11B.

Last layer activation, loss function, output channel and branches have been added for use cases with multiple classes (cf. FIG. 4, use cases 2 and 3). This will be explained with more detail in connection with FIGS. 11AB and FIG. 12.

Also (for all 3 network types), the following parameter settings are useful:

The convolutional neural networks (as disclosed in the mentioned papers) usually apply global average pooling (GAP) and/or fully connected (FC) layers at their CN backends, but it may be advantageous to replace GAP by global sum pooling (GSP). GSP allows CNNs to learn counting as a simple linear mapping problem that is generalized over the input shape (e.g., of an insect).

Convenient parameters are also the following:

Class parameters. Depending on the use case (cf. FIG. 4), the input and output is differentiated into insect classes. As the classes are known in advance (i.e. prior to operating the CNN), the CNN learns different parameters for different classes (in the training phase) and applies different parameters for different classes (in the production phase). Details are explained in connection with FIGS. 11-12.

Function parameters indicate the type of operation that the CNN has to apply. For example, function parameters can trigger the CNN to estimate density maps (e.g., sum of pixel values indicate the number of objects/insects), to perform particular pre-processing (e.g., to apply Gaussian around a centroid to obtain a kernel) and others.

The input size parameter (i.e., input dimension) defines the tile dimension of a tile that is being processed. For example, the input dimension is a tile (or "patch") of 256×256 pixels (cf. the discussion regarding tiles, in FIG. 9).

The learning rate parameter can conveniently be set to $I_r=0.01$. The rate influences the speed (and thereby the duration of the training).

The sigma parameter σ (sigma) is a parameter of the Gaussian kernel (used in the training phase). For example, the parameter can be set to σ=9.

Parameter $I_2$ is a weight decay parameter to reduce overfitting is conveniently set to $I_2=10^{-5}$.

Using dropout is optional; a convenient dropout parameter is 0.5.

Activation parameters indicate the type of activation functions, such as sigmoid or softmax (i.e., normalized exponential function) or others.

Loss function parameters are used to optimize the CNN for accuracy. For example, the loss function parameter indicates the difference between the ground truth and the estimation (e.g., number of insects on a leaf manually counted through annotations vs the number of insects estimated by the CNN). Loss functions can be defined, for example, by mean functions.

Auxiliary parameters can be used to deal with technical limitations of the computers. For example, computer 201/202 that implements the CNNs may use floating point numbers, with a maximum highest number of 65536. However, numerical values that the CNN uses to decide for activation (non-activation) could be in the range between 0.0000 and 0.0067 (e.g., in Gaussian kernel with σ=9).

It may be problematic that CNN 271/272 is not capable of learning what information has to be learned. This is because the contrast (in a density map) between insect (pixel activation of 0.0067) and "no insect" (pixel activation of 0.00) is relatively small. Applying a scale factor increases the contrast in the density maps, and eases the density map estimations (i.e., with integrals over images indicating the number of objects). The scale factor can be introduced as auxiliary parameter. For example, all pixel values may be multiplied by the factor 50.000 at the input, and all output values (i.e., insect counts) would be divided by that factor at the output. The factor just shifts the numerical value into a range in that the computer operates more accurately. The mentioned factor is given by way of example, the person of skill in the art can use a different one.

In implementations, CNN 261/262 (to detect leaves) is a CNN of the DenseNet type. For this purpose, the following parameters are convenient:

The loss function can be a "binary_crossentropy" function.

The activation of the last layer can use a "softmax" function.

The tile dimensions (i.e. the dimensions of the input and output image) can be 224×224 pixels.

In implementations, CNN 271/272 (i.e. the CNN to detect insects) is a CNN of the FCRN type. For this purpose, the following parameters are convenient:

The loss functions can be defined, for example, by means functions, such as Mean Absolute Error, or Mean Square Error.

The tile dimensions can be 256×256 pixels.

Filtering to Differentiate Classes

FIGS. 11A and 11B illustrate a pixel value filter that is implemented as part of a layer in CNN 271/272 in implementations that differentiate more than two insect classes (c). As explained above in connection with FIG. 4, the classes can be, for example (c)=(1), (2) for use case 2, or can be, for example, (c)=(1), (2), (3), (4) for use case 3.

While FIG. 11A focuses on a filter that takes individual pixels into account, FIG. 11B focuses on a filter that takes sets of adjacent pixels (or tile segments) into account. In other words, the filter can be applied to properties of individual pixels (in the example: the color, in FIG. 11A), and the filter can also be applied to properties of pixel pluralities (in the example: a texture made my multiple pixels, in the pixel-group filter of FIG. 11B).

Individual-Pixel Filter

On the left side, FIG. 11A illustrates tile 401-k/402-k as input tile, and on the right side, FIG. 11A illustrates 401-k/402-k as output tiles, differentiated for class (first) and for class (second).

Each tile should have pixels from p=1 to p=P. For tiles with 256×256 pixels, there are 65.536 pixels. The figure illustrates tiles with 12×12=144 pixels just for simplification.

Each pixel "pix" has a RGB triplet (r, g, b) that indicate the share of the primary colors. There are many notations available, for example each share could also be noted by an integer number (e.g. from 0 to 255 for each color in case of 8 bit coding per color).

The filter condition can be implemented, for example, such that pixels from the input are forwarded to the output if the pixel values comply with color parameters Red R(c), Green G(c) and Blue B(c). The conditions can be AND-related.

The color parameters are obtained by training (the insect classes annotated, as explained above).

Much simplified, in a hypothetical example, there should be insects of a first class (first) and of a second class (second). The insects in (first) should be "red", so that the parameters are R(first)>0.5, G(first)>0.0, and B(first)<0.5. An input pixel that complies with the condition is taken over as an output pixel. FIG. 11A symbolizes such a (c)=(first) insect at the left edge of the tile (with 3 pixel) that are taken over to the output tile (first).

The insects in the (second) class should be "blue", so that the parameters are R(first)<0.5, G(first)>0.0, and B(first)>0.5. Such an insect is illustrated at the lower part of the input tile, again here much simplified with 3 pixels.

An input pixel that complies with the condition (for class (second)) is taken over as an output pixel, and FIG. 11A symbolizes such a (c)=(second) insect with pixels (0.1, 0.8, 0.7), (0.2, 0.9, 0.6), (0.1, 0.5 0.8), that are taken over to the corresponding output tile.

It is noted that applying the filter is conveniently implemented as a convolutional layer in CNN 271/272 (the filter filtering tiles, cf. FIG. 11B), but the filter can also be implemented before the splitter module (cf. FIG. 9, the filter for pixels, cf. FIG. 11A).

The filter can be part of the processing channel of CNN 271/272 before the layer(s) that creates the density maps. Therefore, the density maps are class specific.

The color parameters Red R(c), Green G(c) and Blue B(c) are just examples for parameters that are related to pixels, but the person of skill in the art can use further parameters such as transparency (if coded in images) etc.

Pixel-Group Filter

FIG. 11B illustrates a pixel-group filter that takes neighboring (i.e. adjacent pixels) into account. As the pixel-group filter uses convolution, it is implemented within CNN 271/272 that processes tiles 401-k/401-k (i.e., after splitter module 241/242).

FIG. 11B repeats the much simplified "3-pixel-insect" from the left edge of FIG. 11A. The 12×12=144 pixel tile is separated into 4×4=16 segments (from #1 to #16). Each segment has 3×3 pixels, being a square segment.

The figure is simplified, but in implementations, the 256×256 tiles are separated into a different number of pixels, potentially having more pixels per segment.

Segment #10 is being convoluted (with a particular convolution variable, e.g., 3 pixels) to modified segment #10'. Thereby, the pixels values (of the 9 pixels) change.

For example, segment #10 can have the pixel values (1, 0, 1, 0, 1, 0, 0, 0, 0) and segment #10' can have pixel values (0.8, 0.1, 0.0, 0.1, 0.2, 0.7, 0.1, 0.7, 0.0). As FIG. 11B illustrates the pixels in "black" or "white" only, the pixels with values over 0.5 are illustrated "black".

Filter criteria can now be applied to the modified segment #10'. In this respect, FIG. 11B also illustrates a further implementation detail. The modified segments can be encoded in segment-specific values. The figure illustrates such values (by arbitrary numbers) "008", "999" and "008" for segments #1', #10' and #16', respectively. The filter criteria can then be applied to the segment-specific values.

In other words, CNN 271/272 can then perform subsequent processing steps by using the segment codes (the segment-specific values). This reduces the number of pixels to be processed (simplified, by a factor that corresponds to the number of pixels per segment, with 9 in the illustrative example). In one of the last layers, CNN 271/272 can then apply decoding.

FIG. 12 illustrates CNN 271/272 with branches for particular classes (1), (2), (3) and (4). As explained in connection with FIG. 6, the insect-annotations can specify the class (species and growing stage). Training the CNN is performed for channels (or branches) separately. In the example of FIG. 12 there are 4 channels corresponding to 4 classes.

The separation into class-specific layers (by a filter, such as explained in the example of FIG. 11) is illustrated here between internal layer 1 and internal layer 2 (that is provided in a plurality corresponding to the number of classes).

On the right side, FIG. 12 illustrates combined density maps that combiner 262 obtains by combining maps 502-1 to 502-K, separately for each branch to density maps 555(1), 555(2), 555(3) and 555(4). In the example, there are K=36 tiles combined (into one map 555), this number is just selected for simplicity.

Density maps 502 that indicate the presence of an insect (in the particular class) are illustrated with a dot. As in the example, density map 502-29 (in the example illustrated as the map with k=29) indicates an insect of class (1) and an insect of class (2).

In the simplified overview, there the overall integral (k=1 to K) for the combined density maps 555 leads to different estimations: $N_{EST}(1)=2$, $N_{EST}(2)=3$, $N_{EST}(1)=2$, $N_{EST}(3)=2$, and $N_{EST}(4)=7$ (map 502-9 reflects 2 insects). The overall number of insect is $N_{EST}(1)(2)(3)(7)=14$. The illustration of FIG. 12 is simplified in that individual pixels have binary values ("1" or "0"). The calculation by the CNN layers provides pixels with real values (i.e., "grayscale" values). Nevertheless, a cluster of pixels with, for example, 0.1, 0.1, 0.6, 0.1 and 0.1 sum up to an integral 1.

Providing infestation data separated for species and growing stage can be advantageous for the farmer to identify the appropriate countermeasures.

As training is separated for the classes, training is performed separately as well.

It is noted that the illustration as separate branches (i.e., in parallel) is convenient for explanation, but not required. Parallel processing is possible, but the channels can be implemented by serial processing as well. In other words, CNN 271 would be trained for insects in class (1), then for insects in class (2) and so on. In the production phase, CNN 272 would provide density maps for inspects of class (1), then of class (2) and so on.

Sets of Annotated Images for Specialized Purposes

The description now explains further details regarding the training phase **1 by that CNN 261 is enabled to segment leaves (by becoming CNN 271, method 601B) and enabled to count insects (by becoming CNN 272, method 701B).

As explained above, in production phase **2, CNN 272 provides $N_{EST}$ (the estimated number of insects per leaf for particular plant-image 412) as the output. In an ideal situation, the combination of CNN 262 and CNN 272 would calculate $N_{EST}$ to be exactly the so-called ground truth number $N_{GT}$: here the number of insects sitting on the particular main leaf of the plant (from that farmer 192 has taken image 412). The difference between $N_{EST}$ and $N_{GT}$ would indicate how accurate camera 312 and CNNs 262/272 are performing.

Figure 13:
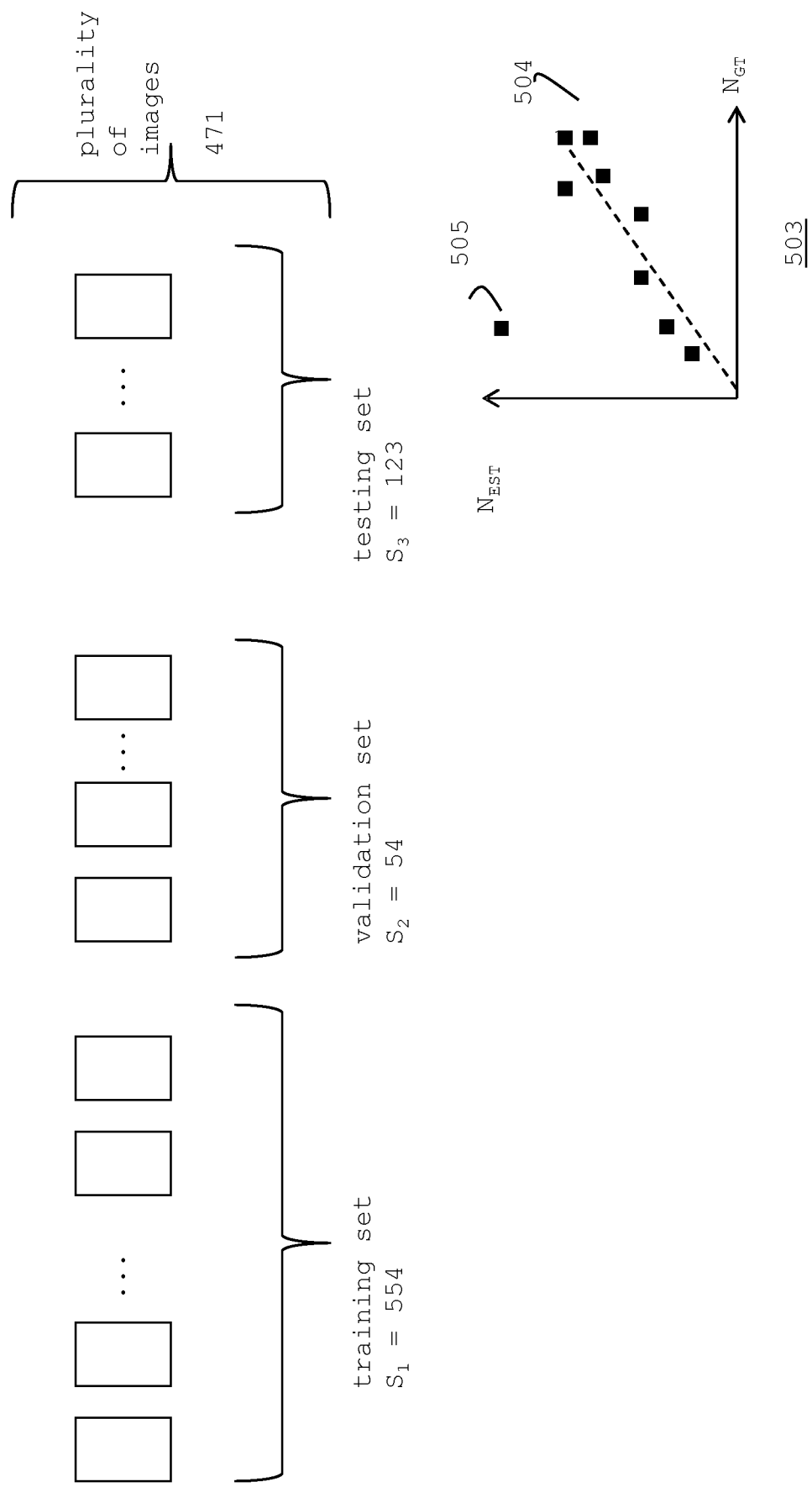
FIG. 13 illustrates a set of insect-annotated images, with sub-sets for training, for validating and for testing.

However, farmer 192 would not manually count the insects ($N_{GT}$). The description now explains how the accuracy of CNN 262/272 is validated. As insect-annotations identify insects (as leaf-annotations identify leaves), the ground truth numbers $N_{GT}$ are known for annotated images 471 already. That data is used as explained in the following:

FIG. 13 illustrates a set of insect-annotated images 472 (i.e., resulting from insect-annotations as in FIG. 6), with sub-sets:
 sub-set for training CNN 271 (cf. FIG. 1)
 sub-set for validating CNN 272 (cf. FIG. 2)
 sub-set for testing CNN 272

The sub-sets have cardinalities $S_1$, $S_2$ and $S_3$, respectively. The number of insect-annotated images S is the sum of the subsets: $S=S_1+S_2+S_3$.

Differentiating images into sub-sets in known in the art. Therefore, FIG. 13 takes the insect-annotated leaf-images 471 as an example only. The person of skill in the art can fine-tune training CNN 271 for the leaf segmentation accordingly.

The cardinalities are specific to the cases (cf. FIG. 4), in the example of the case 1 (1 class), there are S=731 annotated images in total (i.e., insect-annotated leaf-images 471), with
 $S_1$=554 images in the training sub-set (i.e. images 471 to train CNN 271, cf. FIG. 1),
 $S_2$=54 in the validation sub-set, and
 $S_3$=123 images in the testing sub-set.

CNN 261/271 have been trained with the $S_1$ images of the training sub-set to become trained-CNN 262, 272 Trained-CNN 262, 272 have been used to estimate $N_{EST}$ for the $S_2$ images of the validation sub-set. The $S_2$ values $N_{GT}$ are known from the insect-annotations. If for a particular image, $N_{EST}$ is higher than $N_{GT}$ CNNs 262/272 have counted more insects that present in reality.

Below the testing sub-set, FIG. 13 illustrates a simplified graph 503 showing $N_{EST}$ on the ordinate versus ground truth $N_{GT}$ on the abscissa, with a dot identifying an ($N_{EST}$, $N_{GT}$) pair. Graph 503 is simplified in illustrating 9 dots only (instead of, for example, 54 or 123).

Most of the dots are located approximately along regression line 504. The (graphical) distance of a dot from line 504 indicates the quality of the estimation. Dot 505 stands for an outlier, with much more insects estimated than present.

A metric can be defined as Mean Absolute Error (MAE), or MAE=$N_{EST\,s}$–$N_{GT\,s}$ (The formula given here is simplified, MAE is actually calculated as the sum of the MAEs for s=1 to $S_3$ divided by $S_3$).

Since this is a mean value, $N_{EST}$ and $N_{GT}$ are obtained as the average of the $S_3$ images.

A further metric can be defined as Mean Square Error (MSE), or MSE=ROOT [($N_{EST}$–$N_{GT}$)$^2$]. Again, $N_{EST}$ AND $N_{GT}$ for all $S_3$ has to be taken into account (i.e. [ ] being the sum of ( )$^2$ for all $S_3$).

For case 1 (whitefly single class (1)), the set $S_3$ provided values MAE=3.4 and MSE=7.8. In comparison to a traditional approach (candidate selection with subsequent classification, MAE=8.6 and MSE=11.4), the error values are smaller. In other words, the error by the new approach is less than half of the error of the traditional error.

Discussion

Differentiating the main leaf from its adjacent leaves (or neighbor leaves) can be implemented by known methods as well (among them feature extraction). For leaves that are green over a non-green ground, color can be used as a differentiator. However, such an approach would eventually fail for "green" over "green" situations, for example, when one leaf overlaps another leaf.

In alternative implementations, counting insects can be implemented by other known approaches, such as by the above-mentioned candidate selection with subsequent classification.

However, both for leaf differentiation and for insect counting (at the main leaf), the above-described deep learning techniques provide accuracy (i.e., the terms of false positives, false negatives).

Further Implementation Details

For enhance understanding, the description has described a scenario with field user 192 operating mobile device 302. This however not required, image 412 could be taken otherwise, for example by aircraft flying over the field. The example of an unmanned aerial vehicle (UAV) is noted.

In such a scenario, the mobility to catch images on the field would be implemented by the UAV. User interface 392 (cf. FIG. 2) of a smartphone or the like (to communicate the results to field user 191) would potentially implemented otherwise.

Further Discussion of Biological Objects

As explained above—for example, in connection with FIG. 8—the tiles have smaller dimensions than the images, and the tile dimensions correspond to the input layer dimension of CNN 271/272. Since the biological objects (e.g., the insects) are represented in the tiles (both in the training phase as annotations and in the production phase), the physical sizes of the biological object are limited to a maximal physical size. In the extreme case (maximum), the biological object of the largest allowable physical size would correspond to the representation of that object on a single tile.

In other words, the the relation of the physical size of the biological objects (132) to the physical size of the parts (122) is such that the representation of the biological objects on the part-images (422) are such that the representation is smaller than the tile dimension.

Persons of skill in the art can estimate the image resolution (i.e., the number of pixels per physical dimension).

There is also a limitation to the minimum. In the extreme case (minimum), the biological object of the smallest allowable size would be represented (in theory) by one pixel. More practical sizes have been explained above (cf. FIG. 5, 30 pixels times 20 pixels). This translates to absolute minimum size of biological objects that can be recognized. Usually, the biological objects have at least 0.1 mm in diameter, preferably at least 0.5 mm, more preferably at least 1 mm, most preferably at least 5 mm in diameter.

From a high level perspective, the biological objects (132) are (or were) living organisms that are located on the parts (122) (of the plant), or the biological objects are traces by that organisms. (Optionally, the organism may be considered as no longer living, cf. the example with the pupa). More in detail, the biological objects (132) on the parts (122) (of the plant) are selected from the following: insects, arachnids, and mollusca. In an alternative, the biological objects are selected from spots or stripes on the surface of the plant parts. In that alternative, it does not matter if the objects are considered to be organisms or not, spots or stripes can be disease symptoms. For example, brown spots or brown stripes on a plant part indicates that the plant is potentially damaged. For example, some fungi cause brown stripes like yellow rust.

In view of the size (min/max) limitations, not all insects, arachnids or mollusca (or spots and stripes) would fit. For example, a large butterfly insect would potentially cover a single leaf (not countable), but small whiteflies (or a thrips) would be countable, as explained with much detail.

Further Aspects

The description now shortly returns to the left side of FIG. 3 that illustrates an overview to segmentation, with training the CNN on the basis of leaf-annotated plant images 461 and operating the CNN to provide leaf images.

So far, the description has used two examples of plant/insect combinations (cf. the above section "Insects, plants and use cases"). In such embodiments with the special focus to estimate the numbers of insects (such as whitefly or thrips) on plants leaves, the segmentation is performed to segment out the main leaf from the rest of the image. The resulting image is the leaf-image.

However, the embodiments are based on a more general approach: It does not matter if the plant image 461 shows plant parts 122 such the stem, one or more branches, one or more leaves, flowers (usually with petals) or fruits (or other parts mentioned above). These parts—when represented by plant images 411/412—have borders that the CNN can recognize (if appropriately being training before). Looking at FIG. 6, expert user 191 can provide part-specific annotations, such as annotations that identify the stem, that identify a branch, the main leaf (cf. the detailed explanations above), a flower or a fruit (or other parts, as mentioned). More in detail, expert user 191 could provide annotations with more granularity, for example, by annotating the petals that belong to the flowers.

Expert user 191 does not have to identify all parts in one image, but he/she can makes the annotations for parts of the plant should be segmented out by the CNN. For example, if a plant image shows a one or more leaves and a fruit, expert uses 191 could provide a first annotation for the leaf, and a second annotations for the fruit. The annotations would be used separately: in a CNN to identify the main leaf (as described in much detail, trained on the basis of the first annotations) and a CNN to identify the fruit (the skilled person can apply the existing description accordingly, trained on the basis of the second annotations).

In other words, computer 301 interacts with expert user 191 to obtain part-annotations (in general) and/or to obtain leaf-annotations (in particular). Thereby, expert user 191 conveys ground truth information to the images, not only regarding the presence or absence of a main leaf (by the leaf-annotations), but also to the parts in general (by part-annotations).

More in general, there is a computer-implemented method 602B for providing part-segmented images (showing parts of plants). Optionally, the method belongs to an overall process to estimate the number ($N_{EST}$) of objects 132 on parts 122 of a plant 112, wherein method 602B identifies images for the parts.

In a method step, the computer uses first convolutional neural network 262 to process plant-image 412 to derive part-image 422 being a contiguous set of pixels that show a part 422-1 of particular plant 112 completely. First convolutional neural network 262 has been trained (before that method step) by a plurality of part-annotated plant-images 461, wherein the plant-images 411 are annotated to identify parts 421-1.

In one embodiment, there is provided a computer-implemented method for providing a segmentation of plant-images to part-segmented images. A computer program product—when loaded into a memory of a computer and being executed by at least one processor of the computer—performs the steps of this computer-implemented method. The same principle applies to a computer system for providing part-segmented images (showing parts of plants), with the system adapted to perform the method.

As mentioned above, for the leaf-annotation, it does not matter if the leaf shows insects or not. The same principle applies to the parts in general: if the parts (no the images) show biological objects or not does not matter. There is an assumption that the biological objects are located above the parts (e.g., the leaf or the fruit), not at the borders.

Computer System

Figure 14:
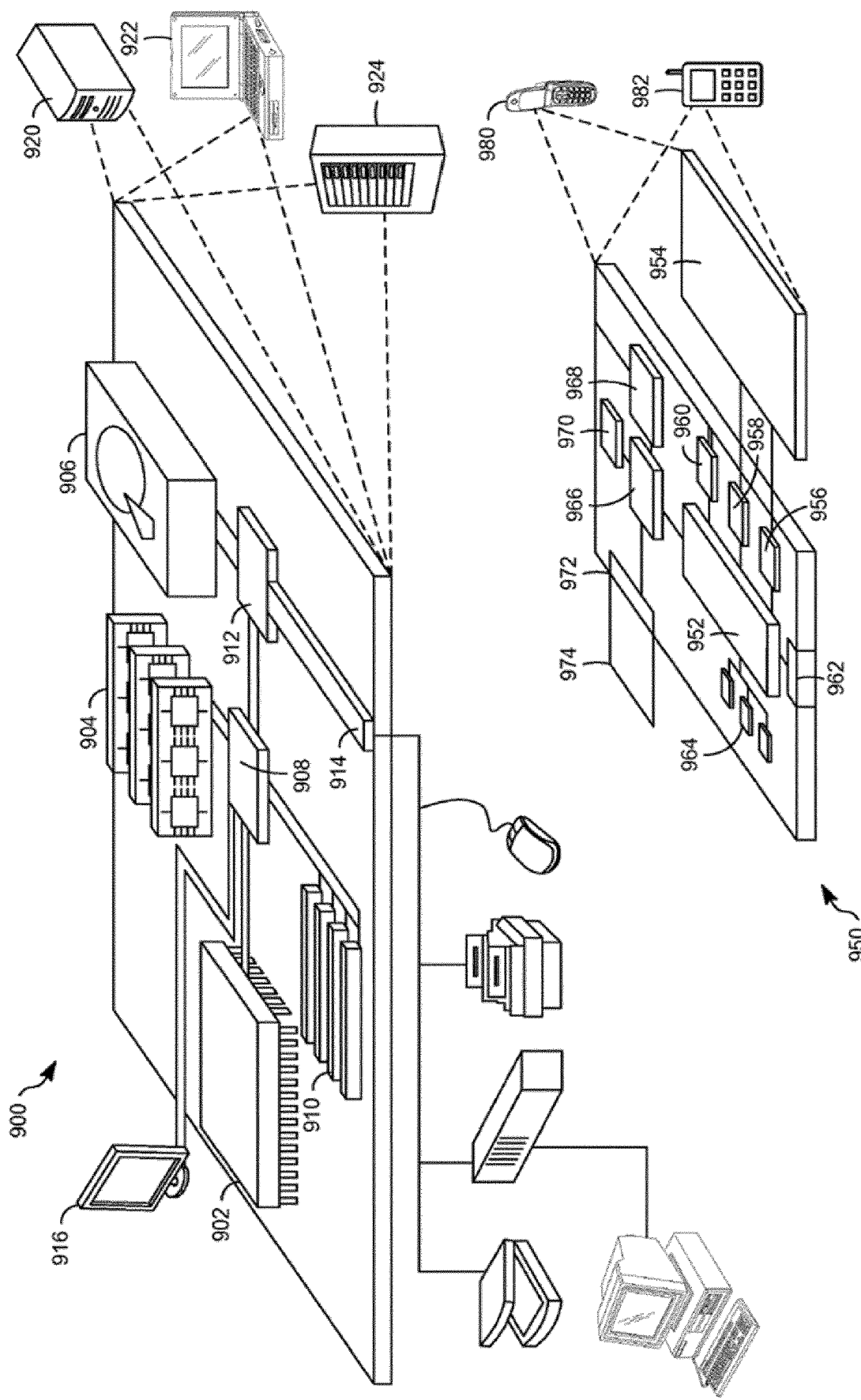
FIG. 14 illustrates a generic computer system.

FIG. 14 illustrates an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to computers 201/202 of FIGS. 1-2. Computing device 950 is intended to represent various forms of mobile devices, such as personal digital assistants, cellular telephones, smart phones, and other similar computing devices. For example, computing device 950 may include the data storage components and/or processing components of devices as shown in FIG. 1. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

REFERENCES (1),(2) . . . insect class
(i), (ii) insect species
α . . . ζ insect annotations
1, 2, 3 use cases
S set cardinality for images
X, Y image coordinates in general
X', Y' annotation coordinates
(A) . . . (D) development stages
111/112 plant
121/122 leaf
131/132 insect (with stages A, B, C, D)
141/142 non-insect object
191/192 user
201/202 computer
261/271 CNN (leaf segmentation)
261/271 CNN (insect detection)
301 computer
302 computer (mobile device)
311/312 camera
342 communication network
392 user interface
411/412 plant-image(s)
421/422 leaf-image(s)
429 to-be-ignored portions in leaf images
431/432 insect on image
441/442 non-insect object on image
451 polygon
461, 471 annotated images
501-$k$/502-$k$ density maps
503-505 graph elements
555 combined density map
6**A pre-processing activities
6**B methods, steps
9** generic computer, with components

The invention claimed is:
1. A computer-implemented method for quantifying biological objects (132) on parts of plants, by estimating the number ($N_{EST}$) of the objects (132) on parts (122) of a plant (112), the method comprising:

receiving a plant-image (412) taken from a particular plant (112), the plant-image (412) showing at least one of the parts (122) of the particular plant (112);

using a first convolutional neural network (262) to process the plant-image (412) to derive a leaf-image (422) being a contiguous set of pixels that show a part (422-1) of the particular plant (112) completely, the first convolutional neural network (262) having been trained by a plurality of part-annotated plant-images (461), wherein the plant-images (411) are annotated to identify parts (421-1);

splitting the leaf-image (422) into a plurality of tiles (402-*k*), the tiles being segments of the plant-image (412) having pre-defined tile dimensions;

using a second convolutional neural network (272) to separately process the plurality of tiles (402) to obtain a plurality of density maps (502-*k*) having map dimensions that correspond to the tile dimensions, the second convolutional neural network (272) having been trained by processing object-annotated plant-images (471), the processing comprising the calculation of convolutions for each pixel based on a kernel function leading to density maps (502) with different integral values for tiles showing biological objects and tiles not showing biological objects; and combining the plurality of density maps (502) to a combined density map (555) in the dimension of the leaf-image (422), and integrating the pixel values of the combined density map (555) to an estimated number of biological objects ($N_{EST}$) for the main leaf.

2. The method according to claim 1, wherein the parts (122) of the plant are selected from the following: stems of the plant, branches of the plant, leaves of the plant, flowers of the plant, fruits of the plant, buds of the plant, seeds of the plant, as well as nodes and internodes of the plant.

3. The method according to claim 2, wherein the relation of the physical size of the biological objects (132) to the physical size of the parts (122) is such that the representation of the biological objects on the leaf-images (422) are such that the representation is smaller than the tile dimension.

4. The method according to claim 1, wherein the biological objects (132) on the parts (122) are selected from the following: insects, arachnids, and mollusca, or wherein the biological objects are selected from the following: spots or stipes on the surface of the plant parts.

5. The method according to claim 1, wherein the first convolutional neural network (262) is of the DenseNet type.

6. The method according to claim 1, wherein the second convolutional neural network (272) is of the Fully Convolutional Regression Network type.

7. The method according to claim 6, wherein the second convolutional neural network (272) had also been modified by implementing an input layer as a pixel value filter for individual pixels or for pixel pluralities.

8. The method according to claim 7, wherein the pixel value filter for pixel pluralities convolutes pixel pluralities that are segments of the tiles, encodes convoluted segments into segment values and applies filtering to the segment values.

9. The method according to claim 8, wherein the second convolutional neural network (272) had also been modified by implementing a layer to decode the segment values to the convoluted segments.

10. The method according to claim 1, wherein the second convolutional neural network (272) has been trained by processing object-annotated plant-images (471) for different classes, identified by object-species and growing stages, wherein processing is separated for the classes by branches and output channels.

11. The method according to claim 1, wherein the step receiving the plant-image (412) is performed by receiving the plant-image (412) from a camera (312) of a mobile device (302).

12. The method according to claim 11, wherein the step receiving the plant-image (412) comprises evaluating an object class and pixel resolution of the camera (311) of the mobile device (302) according to pre-defined rules, wherein for some classes and resolutions, the mobile device (302) is caused to take the image with a magnifying lens.

13. The method according to claim 1, wherein the second convolutional neural network has been trained by using a loss-function being the mean absolute error or being the mean square error.

14. A computer system configured to perform the method according to claim 1.

15. A non-transitory computer-readable medium having instructions encoded thereon that—when loaded into a memory of a computer and being executed by at least one processor of the computer—causes the computer to perform the steps of the method according to claim 1.

* * * * *